United States Patent
Hidaka

(10) Patent No.: US 11,954,386 B2
(45) Date of Patent: Apr. 9, 2024

(54) INFORMATION PROCESSING APPARATUS HAVING ENHANCED PRINTING FUNCTIONS, CONTROLLING METHOD OF INFORMATION PROCESSING APPARATUS, AND STORAGE MEDIUM

(71) Applicant: CANON KABUSHIKI KAISHA, Tokyo (JP)

(72) Inventor: Daichi Hidaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/892,267

(22) Filed: Aug. 22, 2022

(65) Prior Publication Data

US 2023/0078388 A1   Mar. 16, 2023

(30) Foreign Application Priority Data

Sep. 13, 2021  (JP) .................................. 2021-148493

(51) Int. Cl.
G06F 3/12 (2006.01)
(52) U.S. Cl.
CPC .......... *G06F 3/1255* (2013.01); *G06F 3/1205* (2013.01); *G06F 3/123* (2013.01); *G06F 3/1276* (2013.01); *G06F 3/1287* (2013.01)

(58) Field of Classification Search
None
See application file for complete search history.

(56) References Cited

U.S. PATENT DOCUMENTS

| 10,747,481 | B2 | 8/2020 | Kawasaki | |
| 2015/0124276 | A1* | 5/2015 | Harada | G06F 3/1285 358/1.13 |
| 2017/0316289 | A1* | 11/2017 | Miyagi | G06K 15/1822 |
| 2020/0341703 | A1 | 10/2020 | Kawasaki | |

FOREIGN PATENT DOCUMENTS

JP   2019-074906 A   5/2019

* cited by examiner

*Primary Examiner* — Lennin R Rodriguezgonzalez
(74) *Attorney, Agent, or Firm* — VENABLE LLP

(57) ABSTRACT

A non-transitory computer readable storage medium stores an extension application program for extending a function of print data creation software to create print data. The extension application program causing a computer in an information processing apparatus to execute obtaining information of a plurality of functions from a printing apparatus, displaying a print setting screen based on at least a part of the obtained information, and performing control such that among the plurality of functions, a second function that can be used for printing only in combination with a first function which the extension application program does not support is not displayed on the print setting screen.

16 Claims, 21 Drawing Sheets

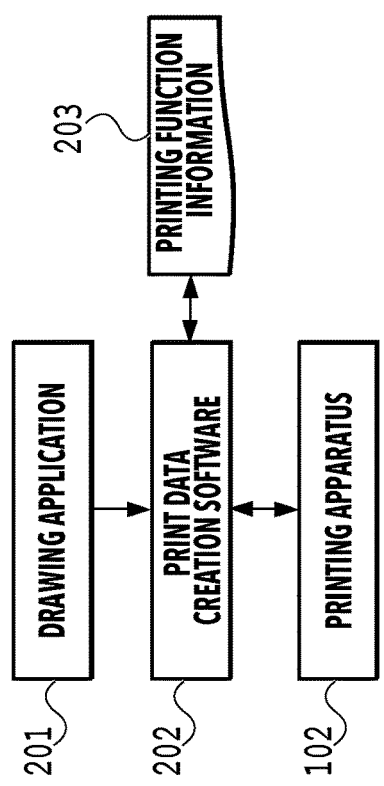
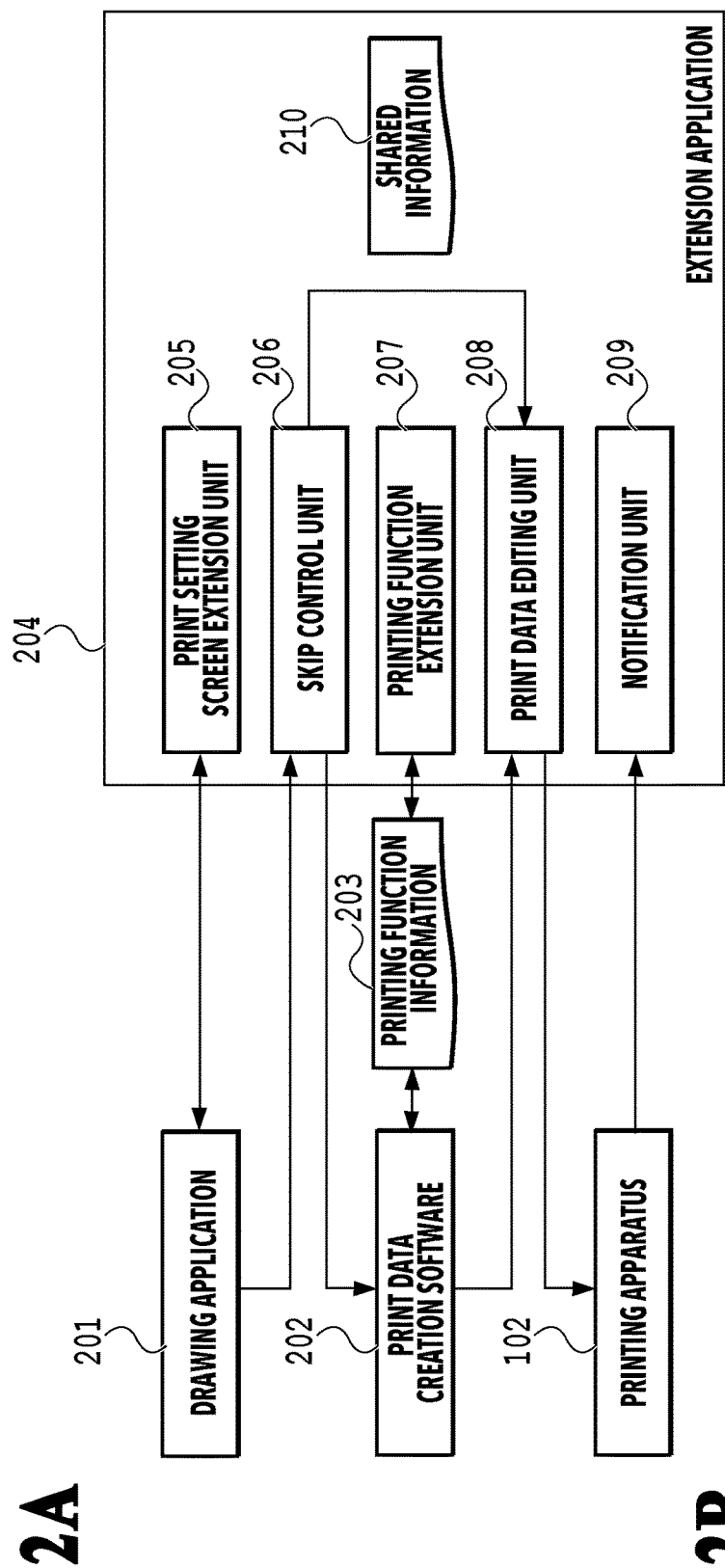
FIG.2A
FIG.2B

```xml
<?xml version="1.0" encoding="utf-8"?>
<PrintDeviceCapabilities....>
  ...
  <psk:PageMediaSize psf2:psftype="Feature">
    <psk:ISOA4 psf2:psftype="Option" psf2:default="true">
      <psk12:PortraitImageableSize...>0,0,210000,297000</psk12:PortraitImageableSize>
      <psk:MediaSizeHeight xsi:type="xsd:integer" psf2:psftype="ScoredProperty">297000</psk:MediaSizeHeight>
      <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option">
      <psk12:PortraitImageableSize ...>0,0,215900,279400</psk12:PortraitImageableSize>
      <psk:MediaSizeHeight xsi:type="xsd:integer" psf2:psftype="ScoredProperty">279400</psk:MediaSizeHeight>
      <psk:MediaSizeWidth xsi:type="xsd:integer" psf2:psftype="ScoredProperty">215900</psk:MediaSizeWidth>
    </psk:NorthAmericaLetter>
    ...
  </psk:PageMediaSize>
  <psk:JobInputBin psf2:psftype="Feature">
    <psk:AutoSelect psf2:psftype="Option" psf2:default="true"/>
    <ns0000:Main psf2:psftype="Option" psf2:default="false">
      <psk:FeedDirection xsi:type="xsd:QName" psf2:psftype="Property">psk:ShortEdgeFirst</psk:FeedDirection>
    </ns0000:Main>
    <ns0000:Rear psf2:psftype="Option" psf2:default="false">
      <psk:FeedDirection xsi:type="xsd:QName" psf2:psftype="Property">psk:ShortEdgeFirst</psk:FeedDirection>
    </ns0000:Rear>
    <ns0000:Disc psf2:psftype="Option" psf2:default="false">
      <psk:FeedDirection xsi:type="xsd:QName" psf2:psftype="Property">psk:ShortEdgeFirst</psk:FeedDirection>
    </ns0000:Disc>
  </psk:JobInputBin>
  ...
</PrintDeviceCapabilities>
```

FIG. 5

```
<?xml version="1.0" encoding="utf-8"?>
<PrintDeviceCapabilities...>
  ...
  <psk:PageMediaSize psf2:psftype="Feature">
    <psk:ISOA4 psf2:psftype="Option" psf2:default="true">
      <psk12:PortraitImageableSize...>0,0,210000,297000</psk12:PortraitImageableSize>
      <psk:MediaSizeHeight xsi:type="xsd:integer" psf2:psftype="ScoredProperty">297000</psk:MediaSizeHeight>
      <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option">
      <psk12:PortraitImageableSize...>0,0,215900,279400</psk12:PortraitImageableSize>
      <psk:MediaSizeHeight xsi:type="xsd:integer" psf2:psftype="ScoredProperty">279400</psk:MediaSizeHeight>
      <psk:MediaSizeWidth xsi:type="xsd:integer" psf2:psftype="ScoredProperty">215900</psk:MediaSizeWidth>
    </psk:NorthAmericaLetter>
    <ns0000:Photo5x5 psf2:psftype="Option" psf2:default="false">
      <psk:MediaSizeWidth xsi:type="xsd:integer" psf2:psftype="ScoredProperty">127000</psk:MediaSizeWidth>  702
      <psk:MediaSizeHeight xsi:type="xsd:integer" psf2:psftype="ScoredProperty">127000</psk:MediaSizeHeight>
      <psk12:PortraitImageableSize xsi:type="psf2:ImageableAreaType"
psf2:psftype="Property">6000,6000,115000,115000</psk12:PortraitImageableSize>
      <psk12:BorderlessImageableSize xsi:type="psf2:ImageableAreaType"
psf2:psftype="Property">0,0,127000,127000</psk12:BorderlessImageableSize>
    </ns0000:Photo5x5>
  </psk:PageMediaSize>
  ...
  <psk:JobInputBin psf2:psftype="Feature">
    <psk:AutoSelect psf2:psftype="Option" psf2:default="true"/>
    <ns0000:Main psf2:psftype="Option" psf2:default="false">
      <psk:FeedDirection xsi:type="xsd:QName" psf2:psftype="Property">psk:ShortEdgeFirst</psk:FeedDirection>
    </ns0000:Main>
    <ns0000:Rear psf2:psftype="Option" psf2:default="false">
      <psk:FeedDirection xsi:type="xsd:QName" psf2:psftype="Property">psk:ShortEdgeFirst</psk:FeedDirection>
    </ns0000:Rear>
    <ns0000:Disc psf2:psftype="Option" psf2:default="false">
      <psk:FeedDirection xsi:type="xsd:QName" psf2:psftype="Property">psk:ShortEdgeFirst</psk:FeedDirection>
    </ns0000:Disc>
  </psk:JobInputBin>
  ...
</PrintDeviceCapabilities>
```

| SIZE | MARGIN | SHEET FEEDING | MEDIUM |
|---|---|---|---|
| A4 | STANDARD | AUTOMATIC | PLAIN PAPER |
| A4 | STANDARD | AUTOMATIC | PHOTO PAPER |
| A4 | BORDERLES | AUTOMATIC | PHOTO PAPER |
| A4 | STANDARD | AUTOMATIC | ENVELOPE |
| A4 | STANDARD | MAIN | PLAIN PAPER |
| A4 | STANDARD | REAR | PLAIN PAPER |
| A4 | STANDARD | REAR | PHOTO PAPER |
| A4 | BORDERLES | REAR | PHOTO PAPER |
| A4 | STANDARD | REAR | ENVELOPE |
| LETTER | STANDARD | AUTOMATIC | PLAIN PAPER |
| LETTER | STANDARD | AUTOMATIC | PHOTO PAPER |
| LETTER | BORDERLES | AUTOMATIC | PHOTO PAPER |
| LETTER | STANDARD | AUTOMATIC | ENVELOPE |
| LETTER | STANDARD | MAIN | PLAIN PAPER |
| LETTER | STANDARD | REAR | PLAIN PAPER |
| DISC | STANDARD | DISC | DISC |

FIG.10

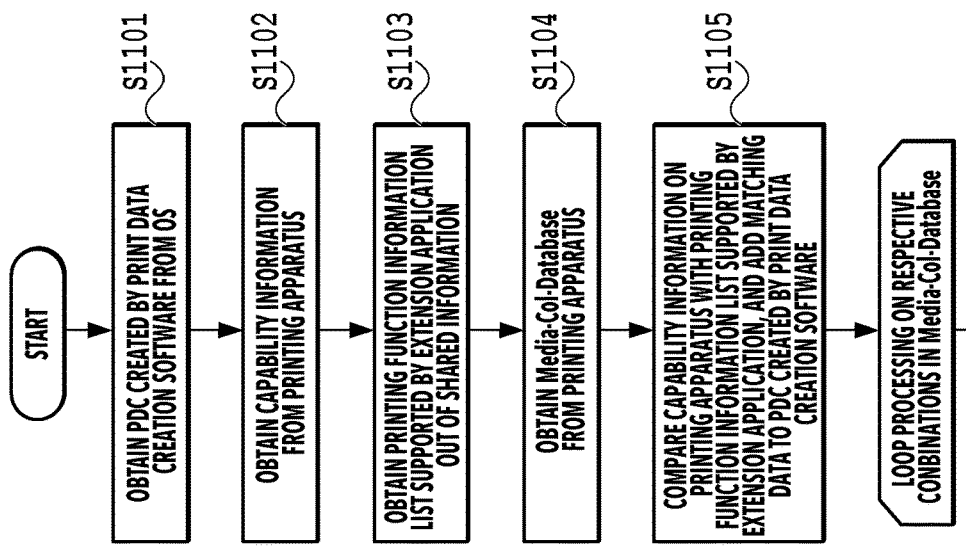

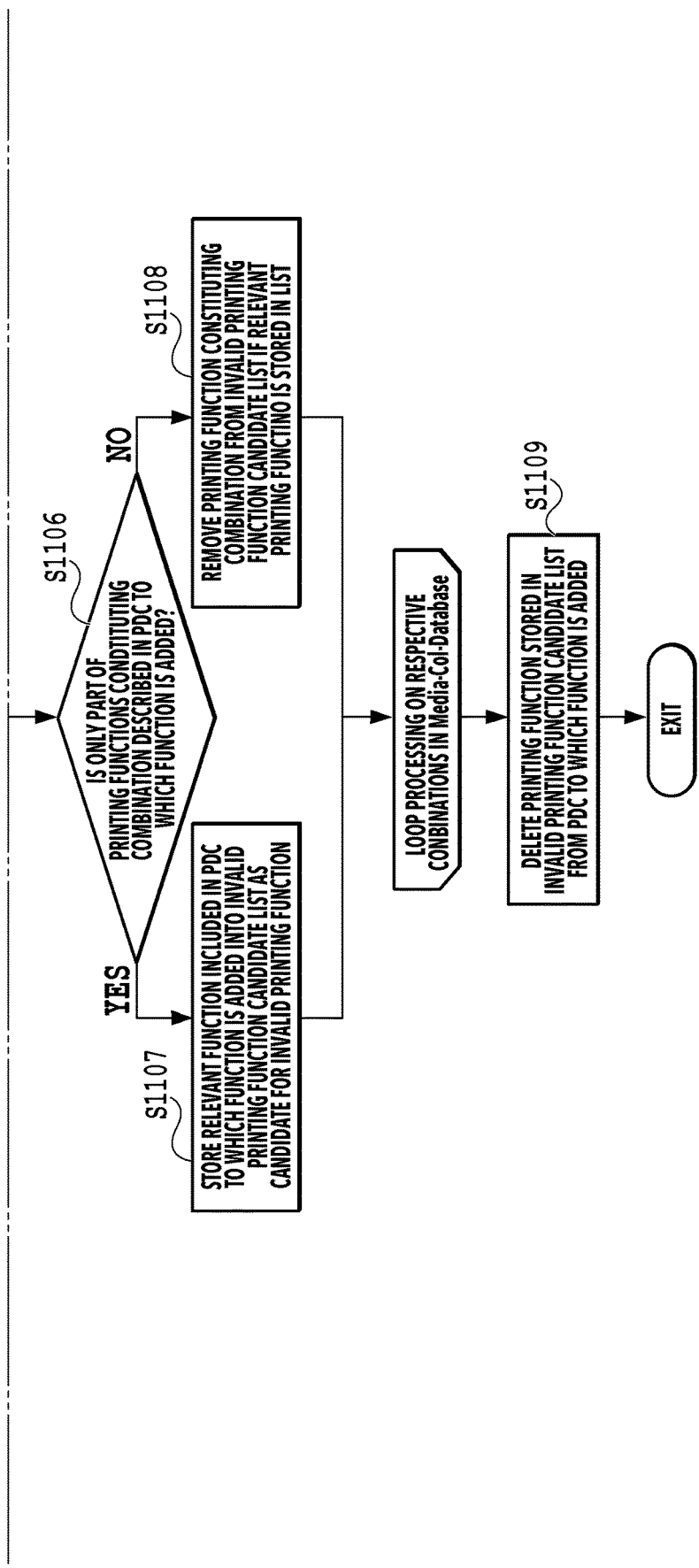

FIG. 12

```xml
<?xml version="1.0" encoding="utf-8"?>
<PrintDeviceCapabilities...>
...
<psk:PageMediaSize psf2:psftype="Feature">
    <psk:ISOA4 psf2:psftype="Option" psf2:default="true">
        <psk12:PortraitImageableSize...>0,0,210000,297000</psk12:PortraitImageableSize>
        <psk:MediaSizeHeight xsi:type="xsd:integer" psf2:psftype="ScoredProperty">297000</psk:MediaSizeHeight>
        <psk:MediaSizeWidth xsi:type="xsd:integer" psf2:psftype="ScoredProperty">210000</psk:MediaSizeWidth>
    </psk:ISOA4>
    <psk:NorthAmericaLetter psf2:psftype="Option">
        <psk12:PortraitImageableSize ...>0,0,215900,279400</psk12:PortraitImageableSize>
        <psk:MediaSizeHeight xsi:type="xsd:integer" psf2:psftype="ScoredProperty">279400</psk:MediaSizeHeight>
        <psk:MediaSizeWidth xsi:type="xsd:integer" psf2:psftype="ScoredProperty">215900</psk:MediaSizeWidth>
    </psk:NorthAmericaLetter>
    <ns0000:Photo5x5 psf2:psftype="Option" psf2:default="false">
        <psk:MediaSizeWidth xsi:type="xsd:integer" psf2:psftype="ScoredProperty">127000</psk:MediaSizeWidth>
        <psk:MediaSizeHeight xsi:type="xsd:integer" psf2:psftype="ScoredProperty">127000</psk:MediaSizeHeight>
        <psk12:PortraitImageableSize xsi:type="psf2:ImageableAreaType"
psf2:psftype="Property">6000,6000,115000,115000</psk12:PortraitImageableSize>
        <psk12:BorderlessImageableSize xsi:type="psf2:ImageableAreaType"
psf2:psftype="Property">0,0,127000,127000</psk12:BorderlessImageableSize>
    </ns0000:Photo5x5>
...
</psk:PageMediaSize>
...
<psk:JobInputBin psf2:psftype="Feature">
    <psk:AutoSelect psf2:psftype="Option" psf2:default="true"/>
    <ns0000:Main psf2:psftype="Option" psf2:default="false">
        <psk:FeedDirection xsi:type="xsd:QName" psf2:psftype="Property">psk:ShortEdgeFirst</psk:FeedDirection>
    </ns0000:Main>
    <ns0000:Rear psf2:psftype="Option" psf2:default="false">
        <psk:FeedDirection xsi:type="xsd:QName" psf2:psftype="Property">psk:ShortEdgeFirst</psk:FeedDirection>
    </ns0000:Rear>
</psk:JobInputBin>
...
</PrintDeviceCapabilities>
```

1201

1202

1501

| TRIGGERS FOR OS TO REQUEST PDC EDITING | NECESSITY OF PDC EDITING |
|---|---|
| NEWLY CONNECTED TO PRINTING APPARATUS | REQUIRED |
| CAPABILITY INFORMATION IN PRINT DATA CREATION SOFTWARE IS UPDATED REQUIRED | REQUIRED |
| EACH OF CAPABILITY INFORMATION ON PRINTING APPARATUS AND PRINT SETTING COMBINATION INFORMATION IS UPDATED | REQUIRED |
| PRINTING FUNCTION INFORMATION SUPPORTED BY EXTENSION APPLICATION IS UPDATED | REQUIRED |
| DISPLAY OF PRINT SETTING SCREEN | NOT REQUIRED |
| START OF PRINTING | NOT REQUIRED |

FIG.15

| Key | Value |
|---|---|
| QUEUE A FOR PRINTER A | PDC OF QUEUE A CREATED BY STANDARD DRIVER AT TIME OF SAVING CACHE |
| | CAPABILITY1 INFORMATION ON MAIN BODY OF PRINTING APPARATUS A AT TIME OF SAVING CACHE (PRINTING FUNCTION INNFORMATION AND Media-Col-Database) |
| | PRINTING FUNCTION INFORMATION LIST SUPPORTED BY EXTENSION APPLICATION AT TIME OF SAVING CACHE |
| QUEUE B FOR PRINTER B | PDC OF QUEUE B CREATED BY STANDARD DRIVER AT TIME OF SAVING CACHE |
| | CAPABILITY1 INFORMATION ON MAIN BODY OF PRINTING APPARATUS A AT TIME OF SAVING CACHE (PRINTING FUNCTION INNFORMATION AND Media-Col-Database) |
| | PRINTING FUNCTION INFORMATION LIST SUPPORTED BY EXTENSION APPLICATION AT TIME OF SAVING CACHE |
| QUEUE C FOR PRINTER C | PDC OF QUEUE C CREATED BY STANDARD DRIVER AT TIME OF SAVING CACHE |
| | CAPABILITY1 INFORMATION ON MAIN BODY OF PRINTING APPARATUS B AT TIME OF SAVING CACHE (PRINTING FUNCTION INNFORMATION AND Media-Col-Database) |
| | PRINTING FUNCTION INFORMATION LIST SUPPORTED BY EXTENSION APPLICATION AT TIME OF SAVING CACHE |

FIG.17

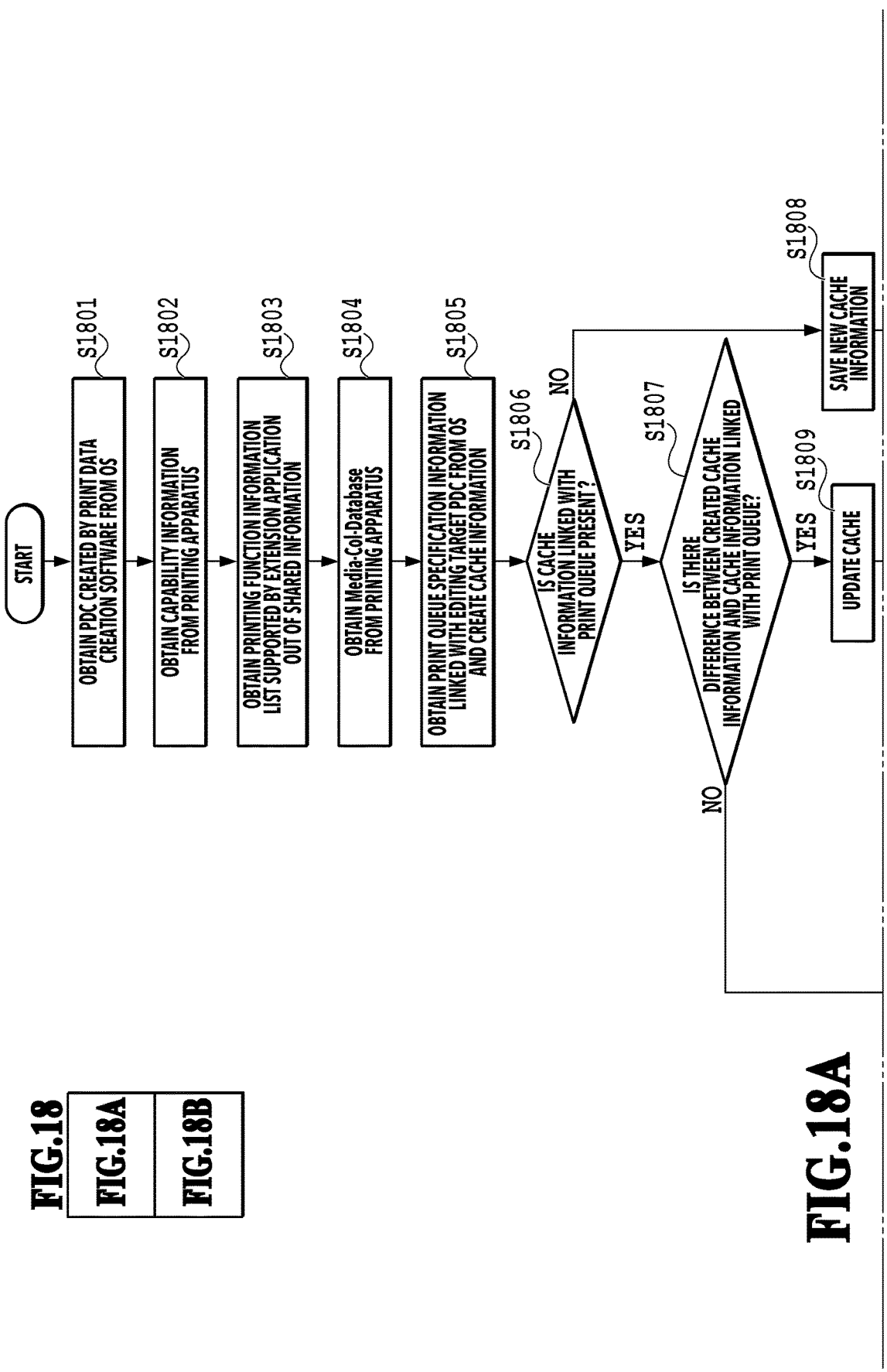

INFORMATION PROCESSING APPARATUS HAVING ENHANCED PRINTING FUNCTIONS, CONTROLLING METHOD OF INFORMATION PROCESSING APPARATUS, AND STORAGE MEDIUM

BACKGROUND

Field

The present disclosure relates to a technique for extending a printing function.

Description of the Related Art

Standard class drivers (hereinafter also referred to as "standard drivers") that can be used in common on printers provided by multiple vendors and operable on Windows (registered trademark) and the like have been provided in recent years. Such a standard driver is included in a package of an operating system (hereinafter referred to as an "OS"). The standard driver is configured to be able to designate a printing function in accordance with PrintCapabilities created based on information obtained from a printing apparatus connected thereto. Thus, a user who uses the standard driver can designate the printing function corresponding to a capability of the connected printing apparatus.

An application for a functional extension (hereinafter also referred to an "extension application") can be associated with the standard driver. The extension application is offered from a vendor that provides the printing apparatus. By offering the extension application, the vendor can provide a function (an extended function) that cannot be implemented only with the standard driver. Japanese Patent Laid-Open No. 2019-74906 (hereinafter referred to as Reference 1) discloses a technique for extending a function such as a stamp function by using an extension application.

SUMMARY

There has been a demand for further ingenuity in order that an extension application may provide a better function.

A controlling method of an information processing apparatus according to one aspect of the present disclosure is a controlling method of an information processing apparatus provided with an extension application program for extending a function of print data creation software to create print data, the controlling method including: displaying a print setting screen by using the extension application program; and performing control such that a prescribed print setting item being displayable by the extension application program based on predetermined information based on information obtained from a printing apparatus by the print data creation software is not displayed on the print setting screen to be displayed by the extension application program.

Further features of the present disclosure will become apparent from the following description of exemplary embodiments with reference to the attached drawings.

BRIEF DESCRIPTION OF THE DRAWINGS

FIGS. 2A and 2B are configuration diagrams of the printing system;

FIG. 5 is a diagram showing an example of the PDC;

FIG. 7 is a diagram showing an example of the PDC after a functional extension;

FIG. 10 is a table showing an example of media-col-database;

FIG. 11 is a diagram showing a relation between FIGS. 11A and 11B,

FIGS. 11A and 11B are charts showing a flow of deletion of an invalid printing function;

FIG. 12 is a diagram showing an example of the PDC after the deletion of the invalid printing function;

FIG. 15 is a table showing examples of reasons for request of PDC editing from an OS;

FIG. 16 is a diagram showing a relation between FIGS. 16A and 16B:

FIG. 17 is a table showing a data structures of cache information for determination of necessity of PDC editing; and FIG. 18 is a diagram showing a relation between FIGS. 18A and 18B;

FIGS. 18A and 18B are charts showing a flow of the deletion of the invalid printing function according to Embodiment 3.

DESCRIPTION OF THE EMBODIMENTS

Preferred embodiments of the present disclosure will be described below in detail with reference to the accompanying drawings. It is to be noted that the following embodiments are not intended to the limit the matters of the present disclosure. In addition, a solution of the present disclosure does not always require the entire combination of the features described in any of the present embodiments. Moreover, the same component elements are denoted by the same reference signs and overlapping explanations thereof will be omitted.

Embodiment 1

<Hardware Configuration of Printing System>

Figure 1:
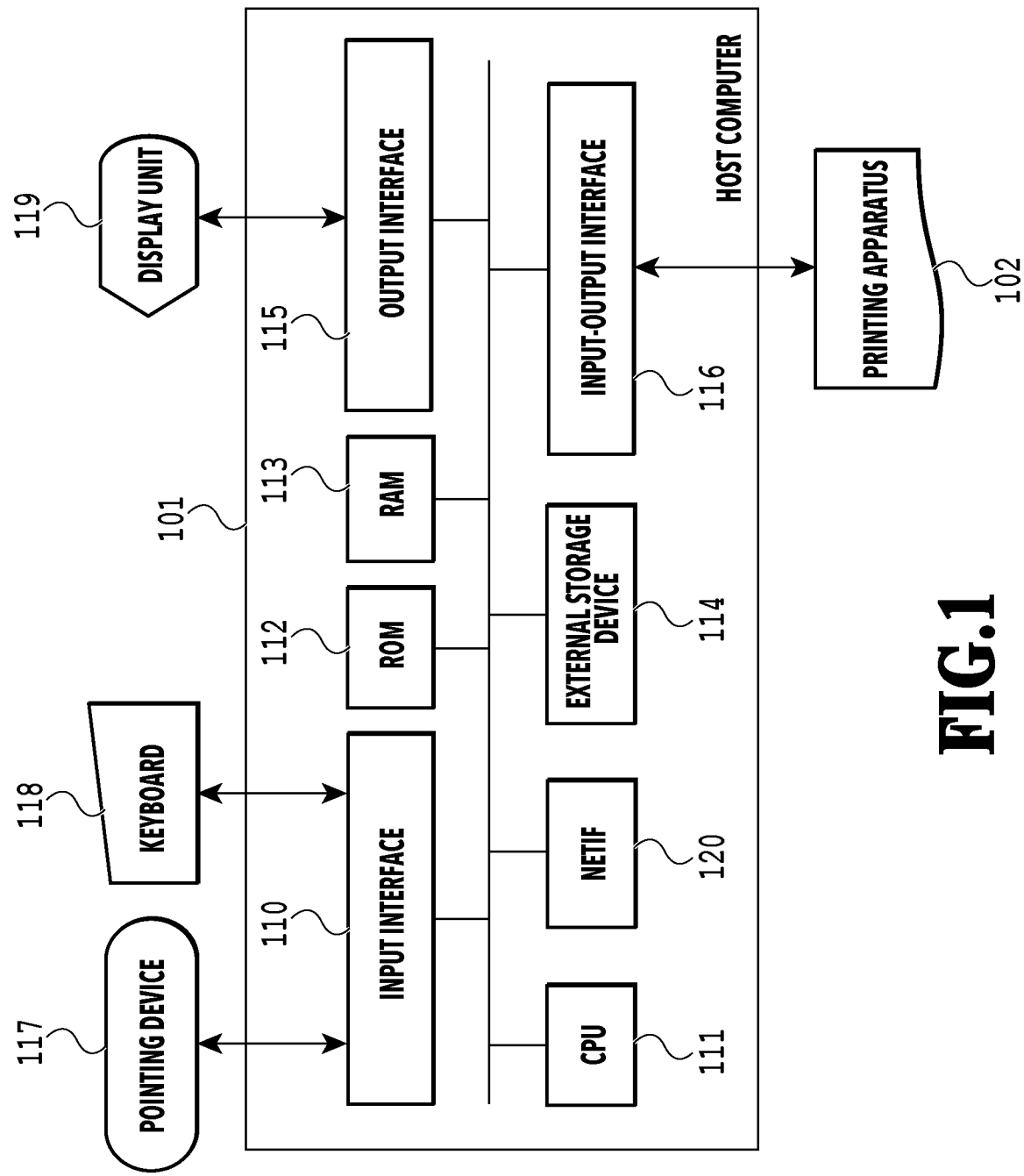
FIG. 1 is a block diagram showing a hardware configuration of a printing system.

FIG. 1 is a block diagram showing a hardware configuration of a printing system of the present embodiment. The printing system includes a host computer 101. FIG. 1 mainly illustrates a block configuration of the host computer. The host computer 101 represents an example of an information processing apparatus. The host computer 101 includes an input interface 110, a CPU 111, a ROM 112, a RAM 113, an external storage device 114, an output interface 115, an input-output interface 116, and a network interface (NETIF) 120. Input devices including a keyboard 118, a pointing device 117, and the like are connected to the input interface 110, while a display device such as a display unit 119 is connected to the output interface 115. The NETIF 120 performs control for carrying out data transfer to and from an external device through a network. In the example shown in FIG. 1, the display unit 119, the pointing device 117, and the keyboard 118 are described as separate devices from the host computer 101. However, these devices may be incorporated in the host computer 101 instead. Alternatively, the display unit 119 may be a touch panel display unit provided with functions as input and output devices.

An initialization program is stored in the ROM 112. The external storage device 114 stores a group of application programs, an operating system (OS), print data creation software, and other various data. Note that the OS in the following description will represent the OS for the host computer 101, which is stored in the ROM 112 unless otherwise specifically stated. Moreover, an application program will be abbreviated as an application in the following description. The RAM 113 is used as a work memory in the case of executing various programs stored in the external storage device 114, among other things. In this way, the various programs can be operated in the host computer 101.

In the present embodiment, the CPU 111 implements functions and processing of the host computer 101 to be described later by carrying out processing in accordance with procedures of the programs stored in the ROM 112.

A printing apparatus 102 serving as an output device is connected to the host computer 101 through the input-output interface 116. Although FIG. 1 illustrates an example in which the host computer 101 and the printing apparatus 102 are separately provided, these apparatuses may be integrated into a single image processing apparatus instead. Here, an ink jet printer that performs printing by ejecting inks onto a paper surface will be described as an example of the printing apparatus. However, the printing may be executed in accordance with other methods (such as an electrophotographic method). In the meantime, the host computer 101 may be any of a desktop personal computer, a smartphone, a tablet terminal, and a laptop personal computer. The input-output interface 116 may be either wired or wireless. Meanwhile, the host computer 101 may be connected to the printing apparatus 102 through a LAN or a WAN such as the Internet.

<Configuration of Printing System Focused on Software>

FIGS. 2A and 2B are diagrams schematically showing a configuration of the printing system. Here, a description will be given on the premise of the printing system that uses the host computer 101 powered by Microsoft (registered trademark) Windows (registered trademark) 10 as the OS. FIG. 2A is a diagram showing a general configuration in a case where an extension application 204 is associated neither with print data creation software 202 nor with the printing apparatus 102. That is to say, FIG. 2A is a diagram showing a general configuration of the printing system in a case where the extension application 204 is not used. On the other hand, FIG. 2B is a diagram showing a configuration of a printing system of the present embodiment, in which the extension application 204 is associated with the print data creation software 202 and the printing apparatus 102.

First, the example of the printing system of the general configuration will be described with reference to FIG. 2A. The printing system of the general configuration includes a drawing application 201 and the print data creation software 202. Moreover, printing function information 203 is stored in the RAM 113 or the external storage device 114. Each of the drawing application 201 and the print data creation software 202 is a program operable in the host computer 101 and is stored in the RAM 113 or the external storage device 114.

The drawing application 201 is software for creating contents (drawing data) to be printed. Examples of the drawing application 201 are various applications to be operated by a user, which include a document creation application, a spreadsheet application, presentation data creation application, and the like. Upon receipt of a print request by accepting an operation from the user, the drawing application 201 issues a print instruction to the OS. The print instruction includes print setting information for instructing operations of the print data creation software 202 and the printing apparatus 102. The print setting information is also referred to as PrintTicket (hereinafter abbreviated as "PT").

The drawing application 201 can display a print setting screen in order to accept a print setting operation from the user and to set the print setting information (the PT). The print setting screen is a screen provided by any of the print data creation software 202, the OS, and the drawing application 201. The print setting screen includes a setting item that indicates a settable printing function, and a control item indicating a set value thereof. The control item is displayed on the print setting screen in accordance with capability information (information settable as a print setting) obtained from the print data creation software 202. The capability information is also referred to as PrintCapabilities (hereinafter abbreviated as "PC"). The print data creation software 202 determines the PC based on the printing function information 203.

The printing function information 203 is data indicating printing functions that describe all the settable printing functions, set values thereof, and exclusive relationship among the set values. The printing function information 203 is also referred to as Print Device Capabilities (PDC). The printing function information 203 is included in a configuration file of the print data creation software 202 and disposed in the external storage device 114 as an unmodifiable file. Alternatively, the printing function information 203 can also be dynamically created by the print data creation software 202. To be more precise, the print data creation software 202 or the OS can be configured to obtain attribute data on the printing apparatus from the printing apparatus 102, and to create the printing function information 203 depending on attribute information in the obtained attribute data. In the case where the printing function information 203 is dynamically created, the created printing function information 203 is editable. Note that the attribute data on the printing apparatus obtained from the printing apparatus 102 is data on a response obtained by issuance of Get-Printer-Attributes operation of IPP to the printing apparatus. The IPP stands for the Internet Print Protocol. The response includes the attribute information indicating the functions that can be designated to the printing apparatus 102 (the capabilities of the printing apparatus) and the set values concerning the attribute information. The data on the response is saved in the RAM 113.

According to the above-described configuration, the print data creation software 202 can establish such a configuration that enables the user to designate the printing function available in each of the printing apparatuses 102 depending on the connected printing apparatuses 102. In other words, even in the case of connecting printing apparatuses having different functions or connecting printing apparatuses developed by different vendors, the print data creation software 202 can still establish the configuration that enables the user to designate the printing function available in each of the connected printing apparatuses. Here, a description will be given of a configuration to use an IPP Class Driver, which is provided in Windows (registered trademark) 10, as the print data creation software 202. The IPP Class Driver is a printer driver that executes print processing in accordance with specifications of a standard printing protocol called the IPP, and is software incorporated in the OS and preinstalled on the host computer 101. In the meantime, the IPP Class Driver is not a unique driver corresponding to the model of the printing apparatus 102 and provided by the vendor of the printing apparatus 102. The IPP Class Driver is a standard class driver that can be used for multiple printing apparatuses in common, and is provided by a vendor of the OS. Moreover, the IPP Class Driver obtains the attribute information on the connected printing apparatus 102 and creates the printing function information 203 based on the information so that the user can designate the printing function supported by the connected printing apparatus 102. As described above, the IPP Class Driver serving as the print data creation software 202 can dynamically create the printing function information 203 (the PDC).

The print setting information (the PT) designated through the print setting screen, which is displayed based on the PC that is based on the printing function information 203 (the PDC), is included in the print instruction to be outputted from the drawing application 201. Note that the print instruction to be outputted from the drawing application 201 includes data to be drawn besides the print setting information (the PT).

The OS creates an intermediate data (also referred to as input data) based on the print instruction outputted from the drawing application 201, and delivers the intermediate data to the print data creation software 202. Here, the data outputted from the drawing application 201 for printing is either data in the Graphic Device Interface format (GDI format data) or data in the XML Paper Specification format (XPS format data). In the case where the IPP Class Driver is used as the print data creation software 202, the OS converts the data format in the case where the data outputted from the drawing application 201 is the GDI format data. Specifically, the OS converts the GDI format data outputted from the drawing application 201 into the XPS format data. Then, the OS delivers the converted XPS format data to the print data creation software 202 as the intermediate data. On the other hand, in the case where the data outputted from the drawing application 201 is the XPS format data, the OS delivers the XPS format data to the print data creation software 202 as the intermediate data. Here, the intermediate data includes drawing data representing information on an image to be formed on a sheet surface, and the print setting information (the PT) set by the user.

The print data creation software 202 converts the obtained intermediate data into print data that is interpretable by the printing apparatus 102, and transmits the print data to the printing apparatus 102. Here, the print data includes the drawing data being the information on the image to be formed on the sheet surface, and print setting attribute information (attribute information to designate the print setting) created based on the print setting information set by the user. The print setting attribute information includes attribute information indicating functions that can be designated to the printing apparatus 102 (the capabilities of the printing apparatus), and set values concerning the attribute information.

The printing apparatus 102 performs printing on the sheet surface based on the print data sent from the print data creation software 202. In this instance, the printing apparatus 102 forms the drawing data included in the print data onto the sheet surface by an operation in accordance with the print setting attribute information included in the print data. The print setting attribute information includes printing quality (priority to image quality, priority to speed, and the like), attribute information for designating double-sided printing and the like as well as set values thereof, and so forth. The printing apparatus 102 executes the double-sided printing in the case where the print setting attribute information includes the attribute information for designating the double-sided printing, for example.

FIG. 2B is a diagram showing a configuration of the present embodiment in a case where the extension application 204 is associated with the print data creation software 202 and the printing apparatus 102. In the following description, a configuration and processing are the same as the configuration and the processing in FIG. 2A unless mentioned otherwise. Moreover, in the following description, processing that is explained to be executed by each software program provided to the host computer 101 will actually be implemented as follows. Specifically, such a software program is implemented by causing the CPU 111 to load the software saved in the ROM 112 and the like onto the RAM 113 and to execute the software program.

The extension application 204 is software for extending a function of the print data creation software 202, which is not the software incorporated in the OS and preinstalled on the host computer 101. For this reason, the user operates the host computer 101, thereby downloading the extension application 204 from a server through the Internet and installing the extension application 204 on the host computer 101. Alternatively, the extension application 204 may be automatically installed on the host computer 101 based on connection of the printing apparatus 102 to the host computer 101. Specifically, in the case where the printing apparatus 102 is connected to the host computer 101, the OS obtains device identification information from the printing apparatus 102. The OS may download the extension application 204 corresponding to the obtained device identification information from the server through the Internet, and install the extension application 204 on the host computer 101. As described above, the print data creation software 202 and the extension application 204 are retained in the host computer 101 as different files.

Here, the print data creation software 202 and the extension application 204 may be updated and subjected to version upgrade. Such update processing will take place at different timings as well. Meanwhile, a timing to obtain the print data creation software 202 by the host computer 101 is different from a timing to obtain the extension application 204. Moreover, a trigger for obtaining the print data creation software 202 by the host computer 101 is also different from a trigger for obtaining the extension application 204. Here, in the case where the extension application 204 is installed, the OS associates the extension application 204 with the print data creation software 202 and with the corresponding printing apparatus 102.

The extension application 204 to be described in the present embodiment includes a print setting screen extension unit 205, a skip control unit 206, a printing function extension unit 207, a print data editing unit 208, and a notification unit 209. Moreover, the extension application 204 includes shared information 210 which is accessible from the respective units in common. In the meantime, the extension application 204 is offered from the vendor that provides the printing apparatus 102. The reality of the shared information 210 is either a file saved in the external storage device 114 or information stored on the RAM 113. The extension application 204 writes and reads information to and from the shared information 210 by using an Application Program Interface (API) offered from the OS.

Here, the extension application 204 may terminate the operation every time processing of each unit is completed. In this case, the OS will activate the extension application 204 at every time of reception of a request for using each unit. Here, other modes are also conceivable. For example, the OS terminates the operation of the extension application 204 in the case where the processing of the print setting screen extension unit 205 is completed. Here, the OS may keep the extension application 204 active even after completion of the processing of the skip control unit 206.

In addition, the extension application 204 may cancel processing in the course of processing by each unit. In the case where the extension application 204 cancels the processing, a job currently processed on a print queue is deleted by the OS. Here, the print queue is a spooler provided to the OS, which is used for storing a created job. Meanwhile, the job is created based on output of the print instruction from the extension application 204, and is stored in the print queue. The intermediate data to be created based on the output of the print instruction from the extension application 204 becomes the data associated with the job that is stored in this instance. In the case where the intermediate data associated with the job is currently processed, a status of the job is currently processed as well. Meanwhile, the job is deleted from the print queue by the OS as a consequence of transmission of the print data obtained by converting the intermediate data associated with the job (in other words, the print data associated with the job) to the printing apparatus 102. Here, the print queue is created by the OS for each printing apparatus 102 that the extension application 204 communicates with. In other words, in the case where the extension application 204 communicates with two or more printing apparatuses 102, for example, the OS creates two or more print queues accordingly. Each print queue thus created is linked with the corresponding printing apparatus 102. Here, the OS may create two or more print queues linked with a certain one of the printing apparatuses 102.

Upon receipt of the print request from the user, the drawing application 201 issues the print instruction to the OS. As with the configuration in FIG. 2A, the print instruction includes the print setting information (the PT). Under the configuration in FIG. 2B, the drawing application 201 can display the print setting screen used for designating the print setting information (the PT) as with the configuration in FIG. 2A. The print setting screen provided by the extension application 204 is displayed under the configuration in FIG. 2B. More specifically, the print setting screen provided by the print setting screen extension unit 205 included in the extension application 204 is displayed. That is to say, display control of the print setting screen is carried out by the print setting screen extension unit 205. Here, the display of the print setting screen provided by the print setting screen extension unit 205 depends on the operation by the user.

In the case where the drawing application 201 accepts the print request from the user and the print instruction is issued to the OS, the OS activates the skip control unit 206. The skip control unit 206 performs control processing to determine as to whether or not it is appropriate to carry out skip processing for skipping the processing of the print data creation software 202. After the skip control processing of the skip control unit 206, the OS creates the intermediate data based on the print instruction outputted from the drawing application 201, and delivers the intermediate data to the print data creation software 202. Here, in the case where the skip processing is not carried out by the skip control unit 206, the print data creation software 202 processes the intermediate data into the print data that is interpretable by the printing apparatus 102, and delivers the print data to the print data editing unit 208. On the other hand, in the case where the skip processing of the print data creation software 202 is carried out, the intermediate data is delivered to the print data editing unit 208 without being processed by the print data creation software 202. Thus, the intermediate data can be processed by the print data editing unit 208.

The print data editing unit 208 edits either the intermediate data delivered from the print data creation software 202 or the print data processed by the print data creation software 202. In a case where layout printing is taken as an example of an editing content, the print data editing unit 208 changes a layout of the intermediate data or the print data based on print setting information on the layout printing received from the OS. The layout printing is an action to lay out and print the data corresponding to N pages into one page, and this action is also called N-in-1, N-up, and the like (in which N means the number of pages). Meanwhile, the print data editing unit 208 can display a UI screen on the display unit 119, so that a result of layout of the intermediate data or the print data can be displayed as a preview screen. After the print data editing unit 208 edits the print data, the print data is delivered to the printing apparatus 102 through the OS. The printing apparatus 102 performs printing on the sheet surface based on the accepted print data. Here, in the case where the print data creation software 202 is skipped by the skip control unit 206, the print data editing unit 208 may convert the received intermediate data into the print data interpretable by the printing apparatus 102. Alternatively, a function provided by the OS may be used in order to convert the intermediate data into the print data.

Moreover, the extension application 204 includes the printing function extension unit 207. The printing function extension unit 207 can edit the printing function information 203 (the PDC) created by the print data creation software 202 or the OS. That is to say, the printing function extension unit 207 can modify the printing function information 203 even in the case where the printing function information 203 is disposed in the external storage device 114 as an unmodifiable file. As described above, the extension application 204 has a function to edit the printing function information 203 (the PDC). The printing function extension unit 207 can add a function provided by the extension application 204. Moreover, the printing function extension unit 207 is also capable of adding a function that is supported by the printing apparatus 102 but not supported by the print data creation software 202, adding exclusive relationship among the set values of the printing functions, and so forth.

The OS activates the printing function extension unit 207 in the case where the extension application 204 is associated with the printing apparatus 102 and the print data creation software 202 for the first time. Moreover, the OS may activate the printing function extension unit 207 at another desired timing such as at the time of activating the OS. Thus, the printing function extension unit 207 can detect an extended function and add the extended function to the printing function information 203 in the case where an optional device (such as a finisher) is added to the printing apparatus 102 later and a function concerning the printing is hence extended, for instance.

In addition, the extension application 204 includes the notification unit 209. The notification unit 209 can display a notification to the user in response to the occurrence of an error in the printing apparatus 102. For example, in a case where a paper out error occurs in the printing apparatus 102, the print data creation software 202 detects the error. Then, the OS causes the display unit 119 to display a message by using the notification function called toast notification, which is a function of the OS. By allowing the user to press this toast notification, the notification unit 209 of the extension application 204 is called by the OS and a UI screen for the notification unit 209 is displayed. For example, the UI screen for the notification unit 209 can display a detailed message on the paper out error, a paper refill method, and the like. Here, besides a clicking action with a mouse or the like, the pressing action is assumed to include a touching action or a tapping action on a touch panel display unit.

Note that the configuration of the extension application 204 for realizing the present embodiment is not limited to the one that includes all the functions (the units) mentioned above. The configuration of the extension application 204 may include only part of the above-mentioned functions or may include other functions in addition. In the meantime, the extension application 204 may simply be referred to as print software. As described above, the extension application 204 includes at least one of the following functions. Specifically, those functions include the function to display the print setting screen (the print setting screen extension unit 205), the function to determine whether or not it is appropriate to skip the processing of the print data creation software 202 (the skip control unit 206), the function to edit the print data to be inputted to the printing apparatus (the print data editing unit 208), the function to extend the function that can be designated by the print data creation software 202 (the printing function extension unit 207), and the function to display the screen in response to the occurrence of the error in the printing apparatus 102 (the notification unit 209).

<Editing Processing of PDC by Printing Function Extension Unit>

A description will be given of a method of adding a printing function to the PDC in the present embodiment based on the printing function supported by the extension application 204 and on the capability information on the printing apparatus 102, which is to be carried out at the time of editing the PDC of the print data creation software by the printing function extension unit 207.

Figure 3:
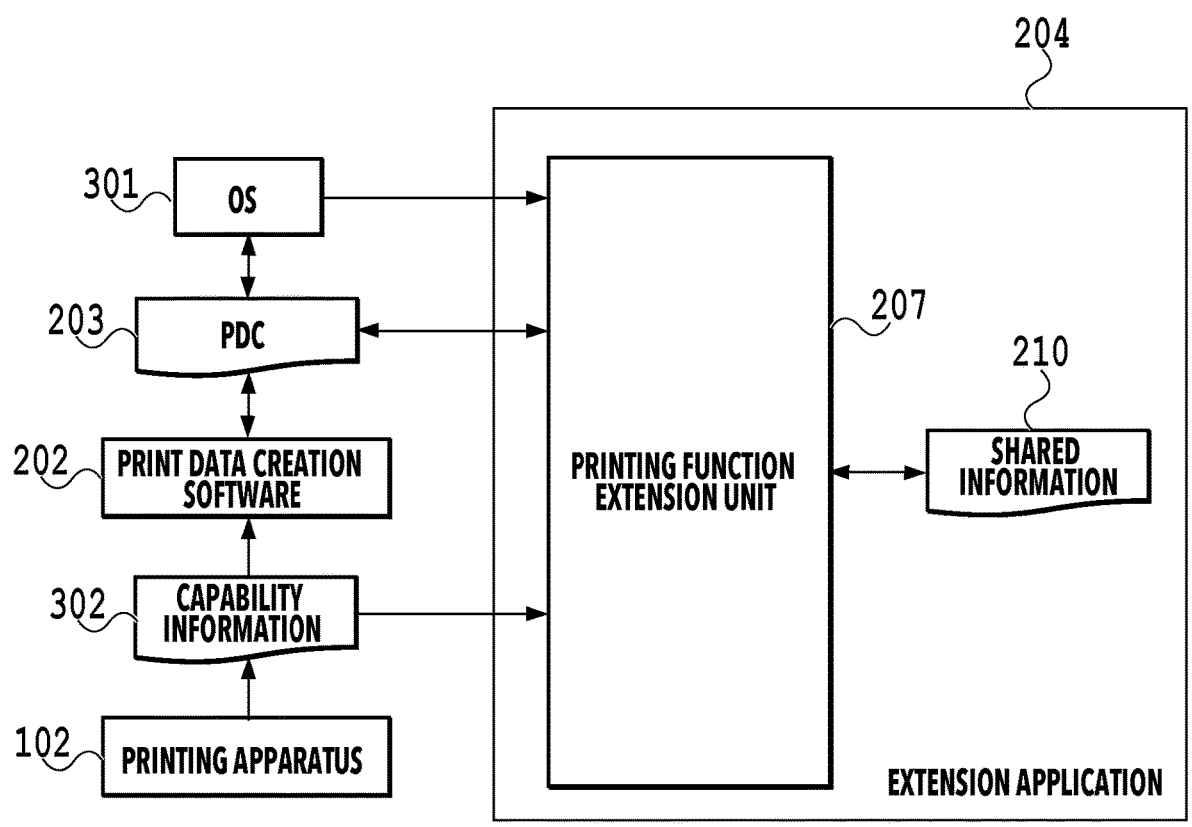
FIG. 3 is a block diagram of PDC extension.

FIG. 3 is a block diagram for explaining the editing processing of the PDC by the printing function extension unit 207 in the printing system of the present embodiment. First of all, the print data creation software 202 obtains capability information 302 on the printing apparatus 102 connected to the host computer 101, and creates the PDC 203 based on this information. The capability information 302 to be obtained from the printing apparatus 102 is information that includes information that can be set as the print settings by the user at the time of printing with the printing apparatus 102. An OS 301 requests the printing function extension unit 207 of the extension application 204 to edit the PDC 203 at the timing of association of the extension application 204 with a print queue involving the printing apparatus 102, for instance. Upon acceptance of the PDC editing request from the OS 301, the printing function extension unit 207 obtains the PDC 203 created by the print data creation software, and starts the PDC editing. Details of the extension of the printing function by the PDC editing will be described later.

Figure 4:
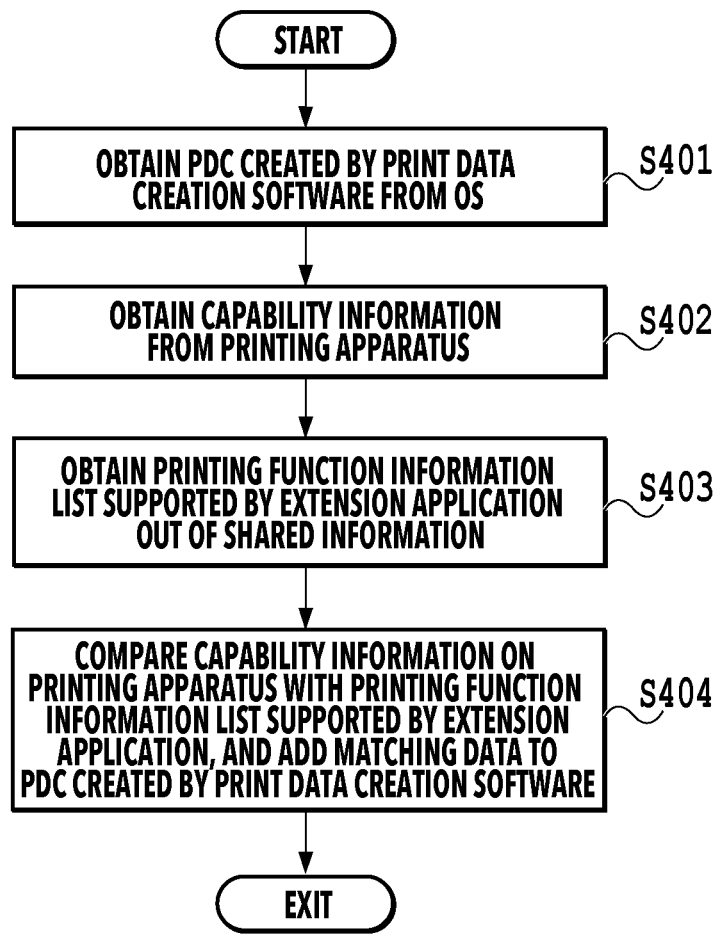
FIG. 4 is a chart showing a flow of editing processing of PDC.

FIG. 4 is a chart showing a principal processing flow out of editing processing of the PDC by the printing function extension unit 207 in the printing system of the present embodiment. In the following description, the printing function extension unit 207 may be explained as an actor of each processing. In reality, however, a relevant function will be implemented by causing the CPU 111 to execute a program corresponding thereto. Note that a code "S" in the explanation of each processing means a step in the flowchart. The same applies to flowcharts that follow FIG. 4.

The flow in FIG. 4 is started, for instance, by activation of the printing function extension unit 207 by the OS 301 at the timing of association with the extension application 204 for the first time.

In S401, the printing function extension unit 207 obtains the PDC 203 as an editing target from the OS 301. The PDC 203 is the PDC created by the print data creation software 202 based on the capability information 302 on the printing apparatus 102.

Here, a specific example of the PDC 203 created based on the capability information 302 obtained from the printing apparatus 102 by the print data creation software 202 will be described with reference to FIG. 5. Here, PDC 501 includes information on functions (Feature) supported by the printing apparatus 102, or information supported by the print data creation software 202 out of information on set values (Option) regarding certain functions. For example, information 502 indicates that ISO A4 and North America Letter can be designated as PageMediaSize (a paper size). Meanwhile, information 503 indicates that a main tray, a rear tray, and a disc tray can be designated as JobInputBin (a sheet feeding opening).

The present embodiment is explained by focusing the description of the printing functions on the paper size and the sheet feeding opening. In reality, however, other Feature or Option elements such as a paper type are also described. Note that a name of a Feature element or a name of an Option element in the PDC used in the following description is merely an example, and other names (information indicating the functions) or settable values may be used instead.

Figure 6A:
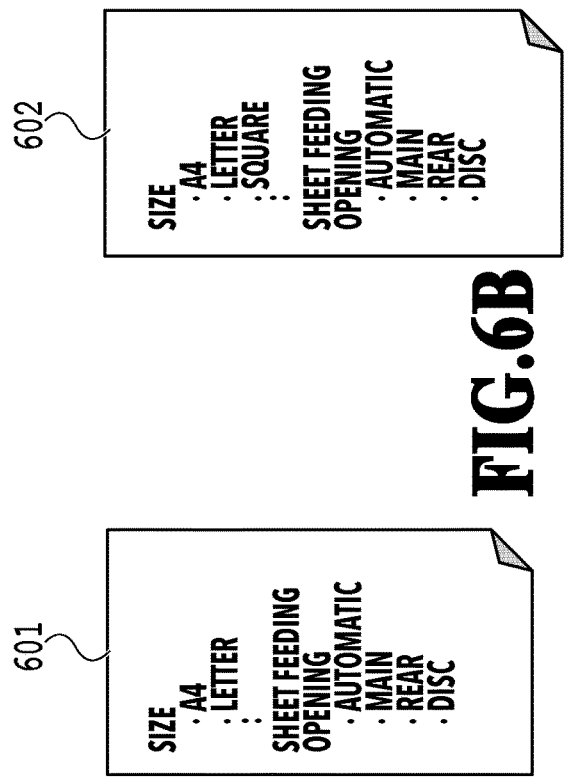
FIGS. 6A to 6E are diagrams showing an example of a variety of information concerning the PDC extension.

PDC 601 in FIG. 6A depicts a simplified list of items corresponding to Feature or Option of the PDC 501 shown in FIG. 5. The PDC 501 and the PDC 601 represent the same PDC.

Figure 6B:
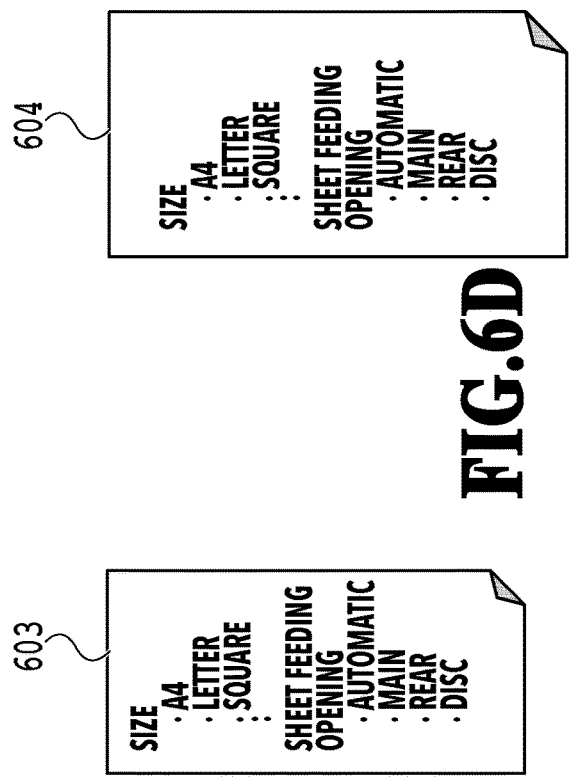

In S402, the printing function extension unit 207 obtains the capability information 302 from the printing apparatus 102. As described earlier, the capability information 302 includes the attribute information indicating the functions that can be designated to the printing apparatus 102 (the capabilities of the printing apparatus) and the set values concerning the attribute information. Here, capability information 602 in FIG. 6B shows simplified representation of an example of the capability information 302 to be obtained from the printing apparatus 102 by the printing function extension unit 207. Specifically, the capability information 602 to be obtained from the printing apparatus 102 describes the printing functions supported by the printing apparatus 102 or the settable values. Here, the capability information 602 is depicted in the same structure as that of the PDC 601 for the same of simplified representation. However, the actual data structures are different from each other. Moreover, as described earlier, the PDC 601 is created by the print data creation software 202 based on the capability information 602 on the printing apparatus 102. Nevertheless, the contents of description in the PDC 601 are different from the contents of description in capability information 602 as shown in FIGS. 6A and 6B. To be more precise, the PDC 601 does not include a description on the paper size "square" whereas the capability information 602 includes that description, because the PDC 601 is created while taking into account the settings settable in the printing apparatus and the settings settable by the print data creation software 202 on its own.

In S403, the printing function extension unit 207 obtains a printing function information list (support information) supported by the extension application 204 out of the shared information 210. The printing function information list supported by the extension application 204 is stored in the shared information 210, which describes all the printing functions that can be processed by the extension application 204 and the set values thereof. The printing function extension unit 207 refers to the printing function information list supported by the extension application 204, which is obtained out of the shared information 210. Hence, the printing function extension unit 207 proceeds with processing to add pieces of the capability information 602 on the printing apparatus 102, which are not described in the PDC 601, to the PDC 601. In the case where the printing function extension unit 207 adds the printing function not supported by the extension application 204 or the set value thereof to the PDC 601, there is a risk the occurrence of an unexpected action in the case where the user selects the relevant printing function or the set value in order to conduct the printing. To prevent such an unexpected action, the extension application 204 needs to retain the supported printing function information list. The printing function information list supported by the extension application 204 may also be updated along with updating the extension application 204.

Figure 6C:
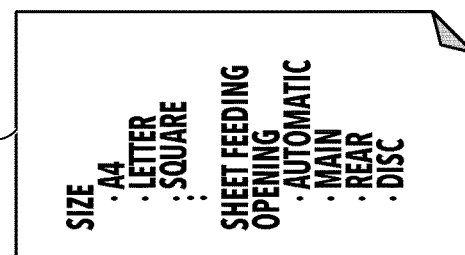

A printing function information list 603 supported by the extension application in FIG. 6C represents a simplified example concerning the printing function information list supported by the extension application 204. Here, the printing function information list 603 supported by the extension application has the same structure as the simplified example of the PDC such as the PDC 601. However, the printing function information list 603 may be described in the same data structure as that of the PDC or described in a data structure other than that of the PDC.

Figure 6D:
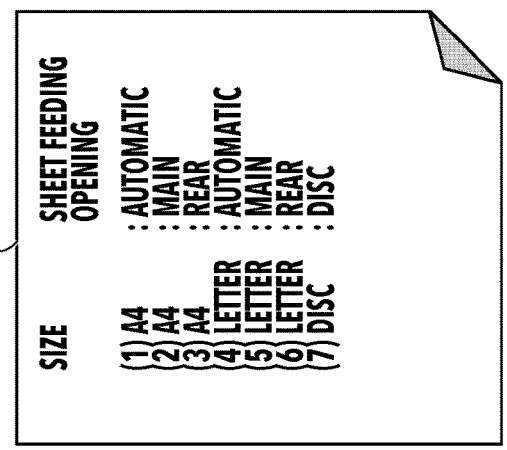

In S404, the printing function extension unit 207 compares the capability information 602 on the printing apparatus 102 obtained in S402 with the printing function information list 603 supported by the extension application obtained in S403. Then, the printing function extension unit 207 adds the printing functions described both in the capability information 602 and in the printing function information list 603 to the PDC 601 of the print data creation software 202 obtained in S401. Note that any printing functions already described in the PDC 601 are not added thereto. Here, the paper size "square" which is described both in the capability information 602 on the printing apparatus 102 and the printing function information list 603 supported by the extension application but is not described in the PDC 601 created by the print data creation software 202 is added to the PDC 601. FIG. 6D shows PDC 604, which is a simplified example of the PDC after the printing function extension unit 207 adds the paper size "square" thereto as a consequence of the processing in S404. Upon completion of the processing in S404, the printing function extension unit 207 terminates this flow.

As described above, by the processing from S401 to S404, the printing function extension unit 207 edits the PDC 601 created by the print data creation software, thereby extending the printing function. As a consequence of the printing function extension processing by the printing function extension unit 207, the printing function that is included in the capability information 302 on the printing apparatus 102 and supported by the extension application 204 is added to the PDC 601 created by the print data creation software 202.

FIG. 7 is a diagram showing the PDC after extending the printing function in accordance with the flowchart. Specifically, the PDC 604 is actually described as PDC 701. In the PDC 701, a paper size "Photo 5×5" 702 representing a paper size is added to the Feature column of the PDC 501 created by the print data creation software 202. A paper size "Photo 5×5" described in the PDC 701 actually corresponds to the paper size "square".

<Example of Screen Displayed by Print Setting Screen Extension Unit>

Figure 8A:
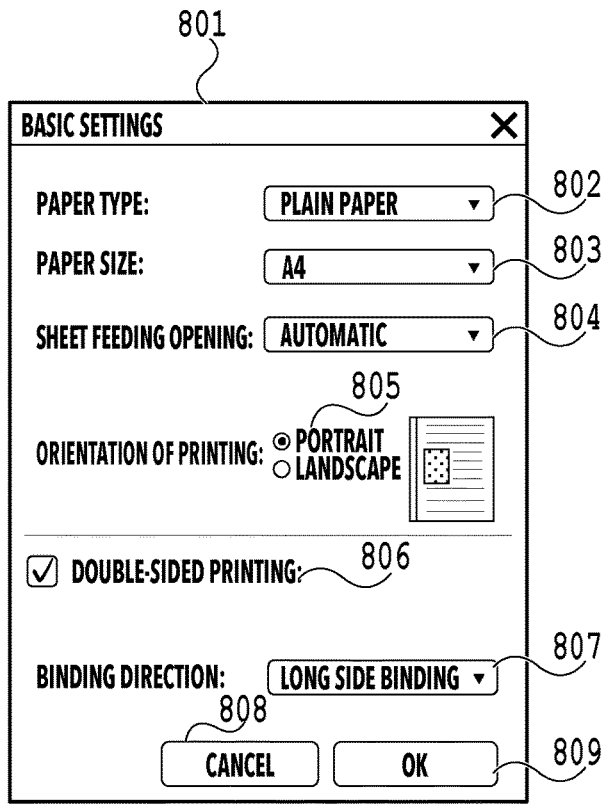
FIGS. 8A to 8C are diagrams showing an example of a print setting screen.
Figure 8B:
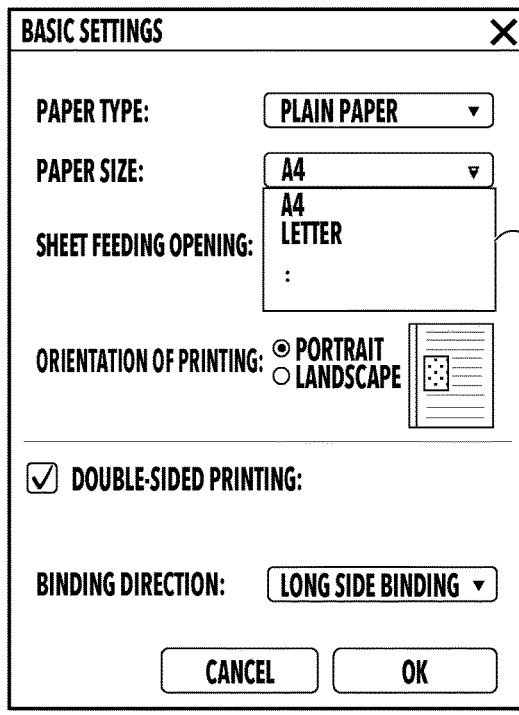
Figure 8C:
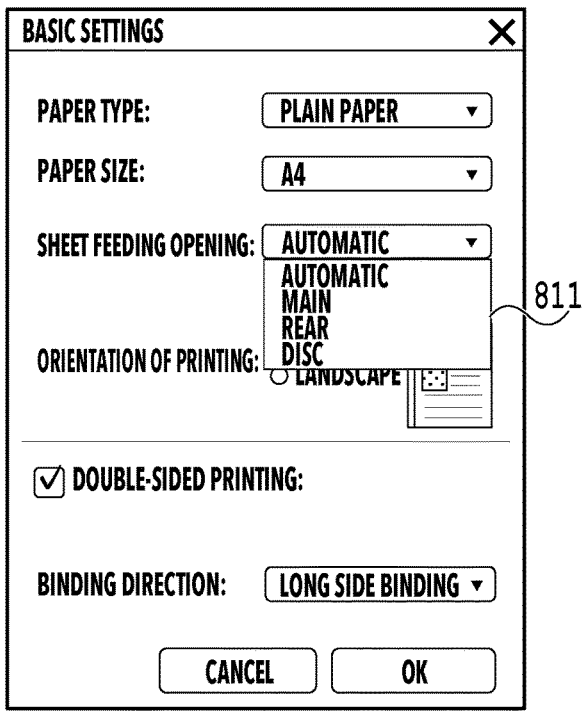

Next, the print setting screen to be displayed by the print setting screen extension unit 205 will be described with reference to FIGS. 8A to 8C. The PC is created based on the PDC 701 which is edited by the processing in FIG. 4. A print setting screen 801 in FIG. 8A is an example of a screen to be displayed by the print setting screen extension unit 205 based on the created PC. Note that an example of the print setting screen based on the PDC 501 will be described in the first place in FIGS. 8A to 8C. An example of the print setting screen based on the PDC 701 will be described later with reference to FIG. 9. The print setting screen extension unit 205 is called by the OS 301 in the case where the user makes an instruction on the drawing application 201 to display the print setting screen. The print setting screen extension unit 205 displays the print setting screen 801 based on the PC available from the OS 301. By operating the print setting screen 801, the user can designate the printing function settable with the print data creation software 202.

A control 802 is a control item that can set the type of the paper used for the printing, which can set an item such as plain paper and photo paper. A control 803 is a control item that can set the size of the paper used for the printing, which can set an item such as A4 and letter. A list 810 shown in FIG. 8B illustrates a state of display in the case of expanding the control 803, and the user can select the paper size from the expanded list.

A control 804 is a control item that can set the sheet feeding opening for a print sheet in the printing apparatus 102, which can set an item such as a main tray and a rear tray. A list 811 shown in FIG. 8C illustrates a state of display in the case of expanding the control 804, and the user can select the sheet feeding opening from the expanded list.

A control 805 is a control item that can set an orientation of printing, which can set either portrait or landscape. A control 806 is a control item that can switch validity and invalidity of double-sided printing. A control 807 is a control item that can set a binding direction in the case of the double-sided printing, which can set an item such as long side binding and short side binding. A control 808 is a cancel button which can close the screen without reflecting the settings. A control 809 is an OK button used to close the screen while reflecting the settings.

Figure 9:
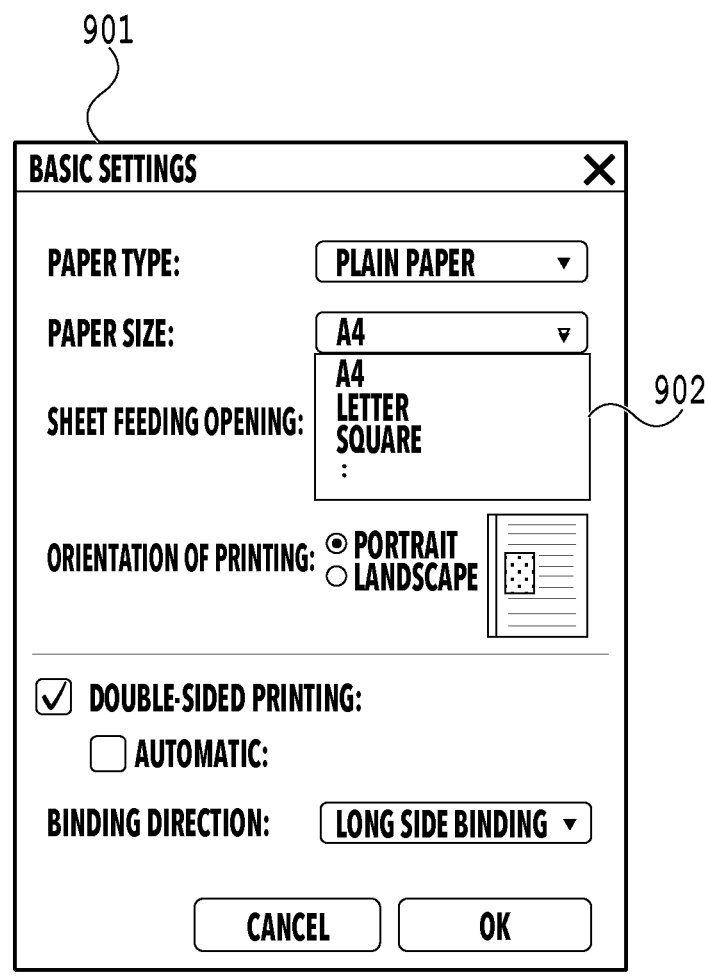
FIG. 9 is a diagram showing an example of the print setting screen after extending a printing function.

A print setting screen 901 in FIG. 9 is a diagram showing an example of the print setting screen after extending the printing function as a consequence of the editing processing in FIG. 4. Here, the paper size "square" added in the course of the editing processing in FIG. 4 is selectable in a list 902 that illustrates a state of expanding the control 803 for the paper size.

<Editing Processing of PDC by Printing Function Extension Unit in Embodiment 1>

Here, it is apparent from the PDC 601 of the print data creation software 202 or the PDC 604 after the editing that the print data creation software 202 is not adaptable to a paper size "disc" but is adaptable to a sheet feeding opening "disc". In this case, the paper size "disc" is not described in the PDC 501 created by the print data creation software 202 or the PDC 701 after the editing, and the sheet feeding opening "disc" is described therein. In the case where the sheet feeding opening "disc" can perform printing only in combination with the paper size "disc", the sheet feeding opening "disc" is the printing function that can be designated by the user, but it is not possible to perform the printing by using the sheet feeding opening "disc" by actually designating this function. In this regard, the sheet feeding opening "disc" is an invalid printing function. It is desirable to configure not to allow the user to designate such an invalid printing function. In the case where the user selects the invalid printing function (such as the sheet feeding opening "disc" on the list 811) on the print setting screen 801 and attempts the printing, the user will encounter a misprint or a print error. A description will be given below of a method of deleting an invalid printing function in a case where the invalid print setting as mentioned above is described in the PDC 601 or the PDC 604.

First of all, the PDC 501 created by the print data creation software 202 based on the capability information 302 obtained from the printing apparatus 102 is formed only from the printing functions supported by the print data creation software 202. On the other hand, the printing apparatus 102 has information called media-col-database (print setting combination information) which describes a list of information on combinations of the print settings with which the printing apparatus 102 can perform the printing. The capability information 302 includes the printing functions that can be designated at the time of the printing with the printing apparatus 102 or the set value thereof, whereas the media-col-database describes the information on the combinations of the printing functions with which the printing apparatus 102 can perform the printing and the set values thereof.

FIG. 10 shows a specific example of the media-col-database. Here, media-col-database 1001 conceptually represents the information included in the media-col-database, which is actually described in a different structure therefrom.

The media-col-database 1001 indicates that the printing is possible in the case where a type, a size, and a margin of a medium as well as the sheet feeding opening satisfy a specific combination. For example, a first row of the media-col-database 1001 indicates printability with a combination of the paper size "A4", the margin "standard", the sheet feeding "automatic", and the medium "plain paper".

Figure 6E:
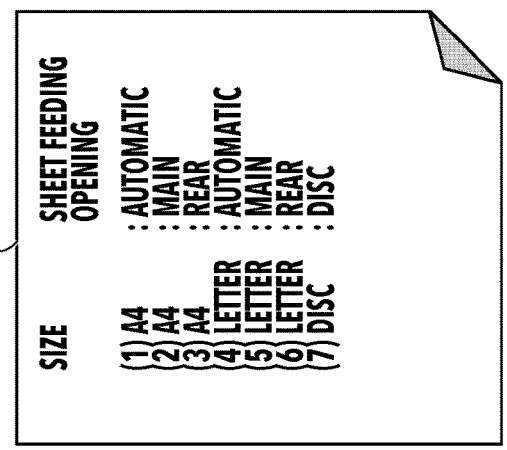

Here, media-col-database 605 in FIG. 6E is a table that simply represents the media-col-database 1001 in FIG. 10. For example, an item (1) indicates printability in the case of a combination of the paper size "A4" and the sheet feeding opening "automatic". Although this table describes only the combinations of the paper size and the sheet feeding portion, the printability is obtained in the case where the margin and the medium also have combinable settings. It is apparent from an item (7) in the media-col-database 605 that the printability is obtained from the sheet feeding opening "disc" only in combination with the paper size "disc". As described above, the sheet feeding opening "disc" is described in the PDC 601 or the PDC 604 even in this case, so that the user can select the sheet feeding opening "disc" on the print setting screen 801. Then, this may cause a misprint or a print error and lead to deterioration in usability.

This problem is solved by referring to the media-col-database 1001 obtained from the printing apparatus 102 at the time of editing the PDC by the printing function extension unit 207 of the extension application 204. To be more precise, the PDC editing is carried out in such a way as to detect an invalid printing function with reference to the media-col-database 1001, and then to remove the invalid printing function. Specific processing steps will be described below.

FIGS. 11A and 11B are charts showing a principal flow of the printing function extension processing and invalid printing function deletion processing by the printing function extension unit 207. A description will be given below of examples in respective steps with reference to FIGS. 6A to 6E and FIG. 12.

In this flow, the processing is started by acceptance of a PDC editing request from the OS 301 by the printing function extension unit 207. Meanwhile, the flow from S1101 to S1103 is the same as the flow from S401 to S403 in the PDC editing processing flow shown in FIG. 4 and explanations thereof will be omitted. Examples of sets of information to be obtained in S1101 to S1103 are assumed to be the PDC 601 of the print data creation software 202, the PDC 203 of the printing apparatus 102, the capability information 602 on the printing apparatus 102, and the printing function information list 603 supported by the extension application 204, respectively.

In S1104, the printing function extension unit 207 obtains the media-col-database from the printing apparatus 102. In this flow, the printing function extension unit 207 is assumed to obtain the media-col-database 1001 shown in FIG. 10 from the printing apparatus 102. The media-col-database 1001 describes the information on the combinations of the printing functions with which the printing apparatus 102 can perform the printing and the set values thereof. The following description uses the media-col-database 605, which is the list that simply represents the media-col-database 1001. In the present embodiment, the printing function extension unit 207 obtains the capability information 302 from the printing apparatus 102 in S1102 and obtains the media-col-database in S1104, that is, in different steps. Instead, the printing function extension unit 207 may obtain the capability information 302 and the media-col-database in the same step.

Thereafter, in S1105, the printing function extension unit 207 carries out the extension of the printing function, or in other words, edits the PDC 203 in the same manner as in S404. Here, the paper size "square" that matches between the capability information 602 on the printing apparatus 102 and the printing function information list 603 supported by the extension application is added to the PDC 601 of the print data creation software 202 by the printing function extension unit 207. Accordingly, the PDC 601 turns out like the PDC 604 after the editing.

After carrying out the extension of the printing function, the steps from S1106 to S1108 are repeated in terms of the list of the sets of information on combinations described in the media-col-database 605 obtained in S1104 until all the combinations are verified. In the repeated processing described from S1106 to S1108, the printing function extension unit 207 verifies whether or not a printing function that satisfies each set of information on combination described in the media-col-database 605 is described in the PDC 604, thus detecting an invalid printing function. A specific processing flow is shown below.

First, in S1106, the printing function extension unit 207 obtains a set of the combination information from the media-col-database 605, and determines whether or not part of the printing functions included in the set of the combination information is described in the PDC 604 that is extended in S1105. For example, the item (1) in the mediacol-database 605 represents the combination of the paper size "A4" and the sheet feeding opening "automatic". The determination turns out to be "No" because the PDC 604 describes both the paper size and the sheet feeding opening. On the other hand, the item (7) in the media-col-database 605 represents the combination of the paper size "disc" and the sheet feeding opening "disc". Here, the "disc" is described only as the sheet feeding opening in the PDC 604. In this case, the determination turns out to be "Yes".

In the case where the determination turns out to be "Yes", the printing function extension unit 207 stores the relevant printing function in an invalid printing function candidate list as a candidate for an invalid printing function in S1107. The invalid printing function candidate list is temporarily stored in the RAM 113 and is retained during the steps from S1106 to S1109.

On the other hand, the processing goes to S1108 in the case of "No". Here, in the case where the printing function included in the set of the combination information is stored in the invalid printing function candidate list as the candidate for the invalid printing function, the relevant printing function is deleted from the invalid printing function candidate list.

The steps from S1106 to S1108 are repeated until the verification is completed for all the sets of the combination information. In the example of the media-col-database 605, all the printing functions that satisfy the combinations depend on the PDC 604 regarding the combinations (1) to (6). Accordingly, the processing goes to S1108. On the other hand, regarding the combination (7), the processing goes to S1107 since the paper size "disc" is not described in the PDC 604 as mentioned earlier, and the sheet feeding opening "disc" is retained as the candidate for the invalid printing function. As a result of verification of all the combinations (1) to (7), the sheet feeding opening "disc" is eventually determined as the invalid printing function. After the verification of all the combinations, the processing goes to S1109 where the printing function extension unit 207 deletes the printing function retained as the candidate for the invalid printing function at this point from the PDC.

Meanwhile, PDC 1201 in FIG. 12 is a diagram showing a specific example of the PDC after the printing function extension unit 207 deletes the invalid printing function from the PDC 701. The item "disc" is deleted from information 1202 that indicates InputBin representing the sheet feeding opening.

Figure 13:
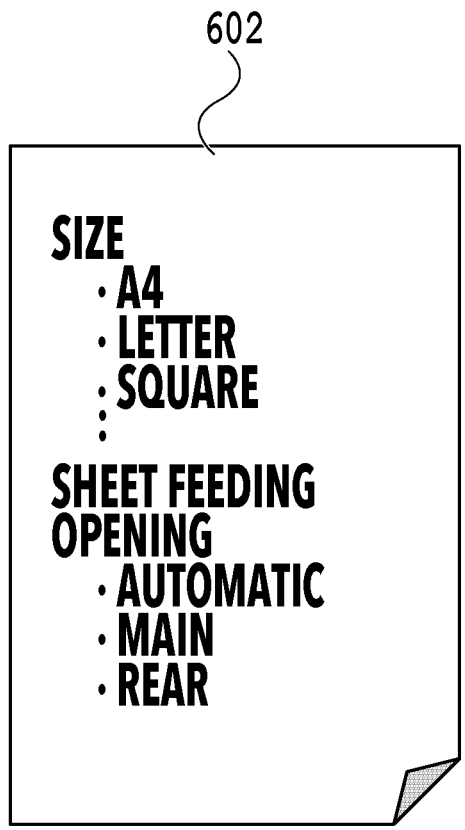
FIG. 13 is another diagram showing the example of the PDC after the deletion of the invalid printing function.

Meanwhile, FIG. 13 shows an example of PDC that simply represents the PDC 1201. As a result of comparison between PDC 1301 in FIG. 13 and the PDC 604, it is apparent that the sheet feeding opening "disc" is deleted in the PDC 1301 from the PDC 604.

Figure 14:
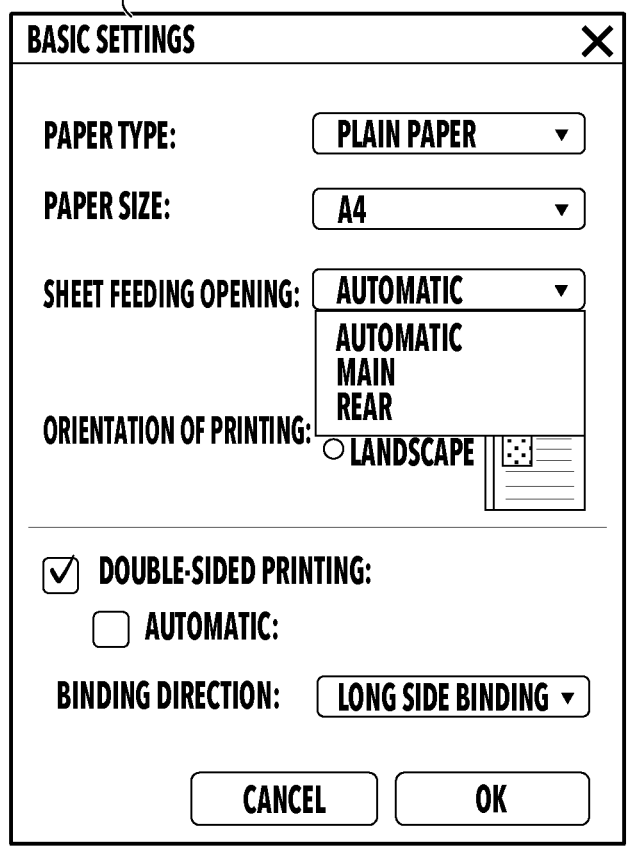
FIG. 14 is a diagram showing an example of the print setting screen after the deletion of the invalid printing function.

In the meantime, a print setting screen 1401 in FIG. 14 shows an example in which the "disc" being the invalid printing function is deleted from a list 811 of the sheet feeding openings on the print setting screen 801 displayed by the print setting screen extension unit 205 of the extension application 204.

The combination that would cause the invalid printing function has been described above by using the paper size and the sheet feeding opening as an example. However, the combination that would cause the invalid printing function is not limited only to the foregoing. For instance, a combination of the "paper type" and the "printing quality" or a combination of the "paper type" and the "paper size" may cause an invalid printing function. The combination of the "paper type" and the "printing quality" will be described below.

The paper types "plain paper", "photo paper", "glossy gold", and "platinum grade" as well as the printing quality factors "highest", "high", "standard", and "draft" are assumed to be described in the capability information 602 of the printing apparatus, respectively. Moreover, regarding the paper type "platinum grade" and the printing quality "highest", printability only with the combination of the foregoing two printing functions is assumed to be described in the media-col-database 605. Moreover, the PDC 601 of the print data creation software and the printing function information list 603 supported by the extension application are assumed to lack the description of the paper type "platinum grade" but to include the printing functions other than the paper type "platinum grade". In other words, the PDC 601 and the printing function information list 603 are assumed to include the descriptions concerning the paper types "plain paper", "photo paper", and "glossy gold" as well as the printing qualities "highest", "high", "standard", and "draft".

In this case, the paper type "platinum grade" is not added to the PDC 604, which is obtained by the functional extension of the PDC 601 of the print data creation software carried out by the extension application 204, since the capability information 602 describes the "platinum grade" but the printing function information list 603 supported by the extension application does not describe the "platinum grade". On the other hand, the printing quality "highest" will be added to the PDC 604 in the case where the PDC 601 does not include this description in the first place. The paper type "platinum grade" and the printing quality "highest" are the setting items of the printing functions that can establish the printability only with the combination of these two printing functions. Accordingly, the printing quality "highest" described in the PDC 604 after the functional extension becomes an invalid printing function. Even in the case where the user conducts printing while setting the printing quality "highest", an actual print product is printed in a state not in the "highest" printing quality or causes a print error. Since this invalid printing function, namely, the printing quality "highest" is deleted by adopting the present embodiment, it is possible to prevent the user from encountering a misprint or a printing error.

The present embodiment is applicable to cases other than the above-mentioned examples as appropriate. For instance, the paper type "fine art" and the paper size "for fine art" are printing functions that can establish printability only with the combination of these two printing functions, and are therefore prone to cause an invalid printing function. As described above, it is possible to eliminate the existence of such an invalid printing function that is likely to be caused by the combination of the paper type "fine art" and the paper size "for fine art" by applying the present embodiment.

As described above, according to the present embodiment, it is possible to provide a better function as the extension application. To be more precise, at the time of PDC editing by the extension application, it is possible to add a printing function to the PDC created by the print data creation software based on the printing functions supported by the extension application 204 and the capability information on the printing apparatus 102. Moreover, it is possible to delete the invalid printing function caused by the creation of the PDC by the print data creation software 202 and the editing of the PDC by the extension application. By deleting the invalid printing function, it is possible to prevent the user from setting the invalid printing function and from encountering a misprint or a print error.

Embodiment 2

Next, Embodiment 2 will be described. There are various triggers for the OS to request the PDC editing by the extension application. However, there are also cases where the PDC editing does not have to be carried out depending on the triggers. In the case where the extension application edits the PDC, a certain processing load such as an action to obtain the PDC from the printing apparatus is applied. In this regard, it is desirable to avoid unrequired PDC editing.

The present embodiment is configured to obtain a reason for request of PDC editing from the OS 301 in the case where the extension application 204 accepts a PDC editing request from the OS 301. Thus, a necessity of the PDC editing is determined and a processing load is reduced by skipping unrequired PDC editing.

FIG. 15 is a diagram showing a table of triggers for the OS 301 to request the PDC editing and the necessity of PDC under the circumstances. As shown in a table 1501, there are four cases as examples where the PDC editing is required. The first case is a case where the host computer 101 is newly connected to the printing apparatus 102 and the print data creation software 202 newly creates the PDC 203. The second case is a case where the PDC 601 of the print data creation software 202 is updated due to version update of the OS 301 and the like. The third case is a case where each of the capability information 602 on the printing apparatus 102 and the media-col-database 605 is updated due to updating of the printing apparatus 102 and the like. The fourth case is a case where the printing function information list 603 supported by the extension application 204 is updated due to updating of the extension application 204 and the like.

Regarding the first case, the PDC editing has to be carried out because the PDC 203 newly created by the print data creation software 202 is not in an extended state. Meanwhile, the PDC editing is also required in the second to fourth cases due to respective reasons. Note that the PDC editing is also required in a case other than the second to fourth cases on the condition that the PDC editing request from the OS 301 is accepted based on such a trigger that may possibly add a new printing function to the existing PDC or possibly bring about a new invalid printing function therein.

On the other hand, the PDC editing is not required in a case where the PDC editing request from the OS 301 is accepted based on such a trigger without a possibility to add a new printing function to the existing PDC or without a possibility to bring about a new invalid printing function therein. Examples of such a case include a case where the user displays the print setting screen, a case where the OS 301 issues the PDC editing request at the start of printing, and so forth.

<Editing Processing of PDC by Printing Function Extension Unit in Embodiment 2>

Figure 16A:
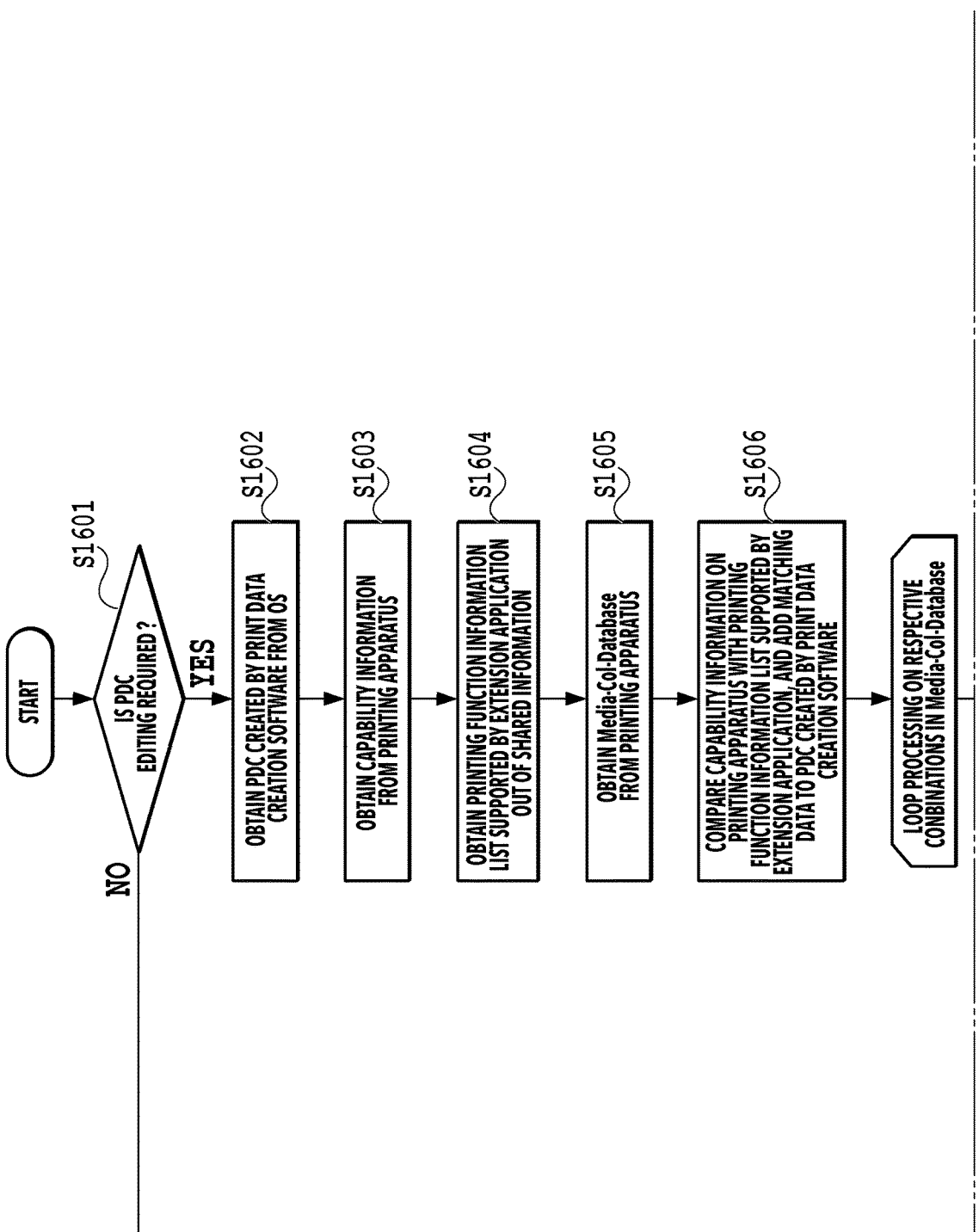
FIGS. 16A and 16B are charts showing a flow of the deletion of the invalid printing function.
Figure 16B:
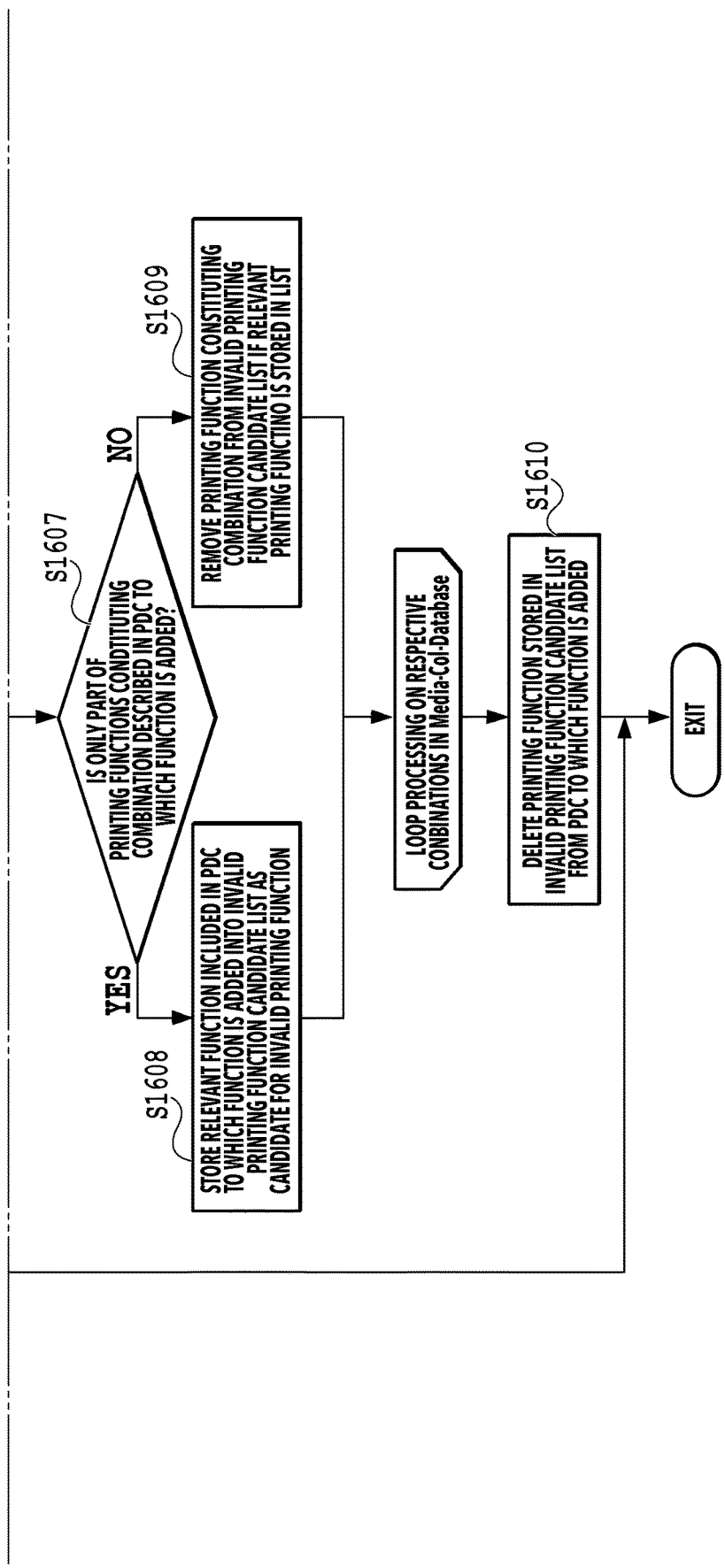

FIGS. 16A and 16B are charts showing a principal processing flow out of the editing processing of the PDC by the printing function extension unit 207 of the present embodiment. Here, the processing from S1602 onward is the same as the flow in S1101 to S1109 in the flowchart of the principal processing out of the editing processing of the PDC by the printing function extension unit 207 in the Embodiment 1. For this reason, explanations on the processing from S1602 onward will be omitted.

In S1601, the printing function extension unit 207 obtains the reason for request of PDC editing from the OS 301, and determines whether or not the PDC editing is required. The reason for request of PDC editing obtained from the OS 301 is assumed to include the trigger information by which the OS 301 requests the PDC editing. In the case where the reason for request of PDC editing obtained from the OS 301 is categorized into the "case where the PDC editing is required" in table 1501, the printing function extension unit 207 determines that the PDC editing is required. In the case where the reason for request of PDC editing obtained from the OS 301 is categorized into the "case where the PDC editing is not required" in table 1501, the printing function extension unit 207 determines that the PDC editing is not required. In the case where the printing function extension unit 207 determines in S1601 that the PDC editing is required, the processing goes to S1602 and the subsequent procedures are carried out. In the case where the printing function extension unit 207 determines in S1601 that the PDC editing is not required, the subsequent processing is skipped and this flow is terminated.

As described above, the unrequired PDC editing is skipped by causing the printing function extension unit 207 to obtain the reason for request of PDC editing from the OS 301 and to determine whether or not the PDC editing is required. This makes it possible to reduce the processing load associated with the PDC editing.

Embodiment 3

Next, Embodiment 3 will be described. As with the Embodiment 2, the present embodiment is also configured to cause the extension application 204 to determine the necessity of the PDC editing and to skip the unrequired PDC editing, thereby reducing the load of the PDC editing processing. In the Embodiment 3, the configuration to cause the extension application 204 to determine the necessity of the PDC editing is different from the relevant configuration in the Embodiment 2. A specific example of causing the extension application 204 to determine the necessity of the PDC editing in the Embodiment 3 will be described below.

Each of the four cases described in the Embodiment 2 corresponds to the case where the PDC editing is required, for example. In the present embodiment, the new connection or the updating of a variety of information in these cases will be detected by obtaining a difference from cache information stored in the shared information 210 of the extension application 204, and then the necessity of the PDC editing is determined.

A data structure 1701 shown in FIG. 17 is a diagram showing a data structure of the cache information. Here, the PDC 601 of the print data creation software 202, the capability information 602 on the printing apparatuses, the printing function information list 603 supported by the extension application, and the media-col-database 605 will be referred to as "information used for cache" for the purpose of abbreviation.

In order for the printing function extension unit 207 to store the "information used for cache" in the shared information 210 as the cache information, it is necessary to check print queue specification information. The print queue specification information is information for specifying which print queue the "information used for cache" is linked with. In the present embodiment, the print queue is linked with the printing apparatus 102. Accordingly, to put it another way, the print queue specification information is information for specifying which printing apparatus 102 the "information used for cache" is linked with. In the present embodiment, the printing function extension unit 207 is assumed to be able to obtain the print queue specification information from the OS 301. By obtaining the "print queue specification information" from the OS 301, the printing function extension unit 207 pairs the "print queue specification information" with the "information used for cache" corresponding thereto, thus creating the "cache information" in a data structure like the data structure 1701. In other words, the "cache information" is the information that includes the "print queue specification information" and the "information used for cache".

In the present embodiment, the above-mentioned cache information is stored in the shared information 210 of the extension application 204 in the case where the printing function extension unit 207 carries out the PDC editing. Thereafter, the necessity of the PDC editing is determined by obtaining a difference between the newly obtained "information used for cache" and the cache information stored in the shared information 210 in the case where there is the PDC editing request from the OS 301.

<Editing Processing of PDC by Printing Function Extension Unit in Embodiment 3>

Figure 18B:
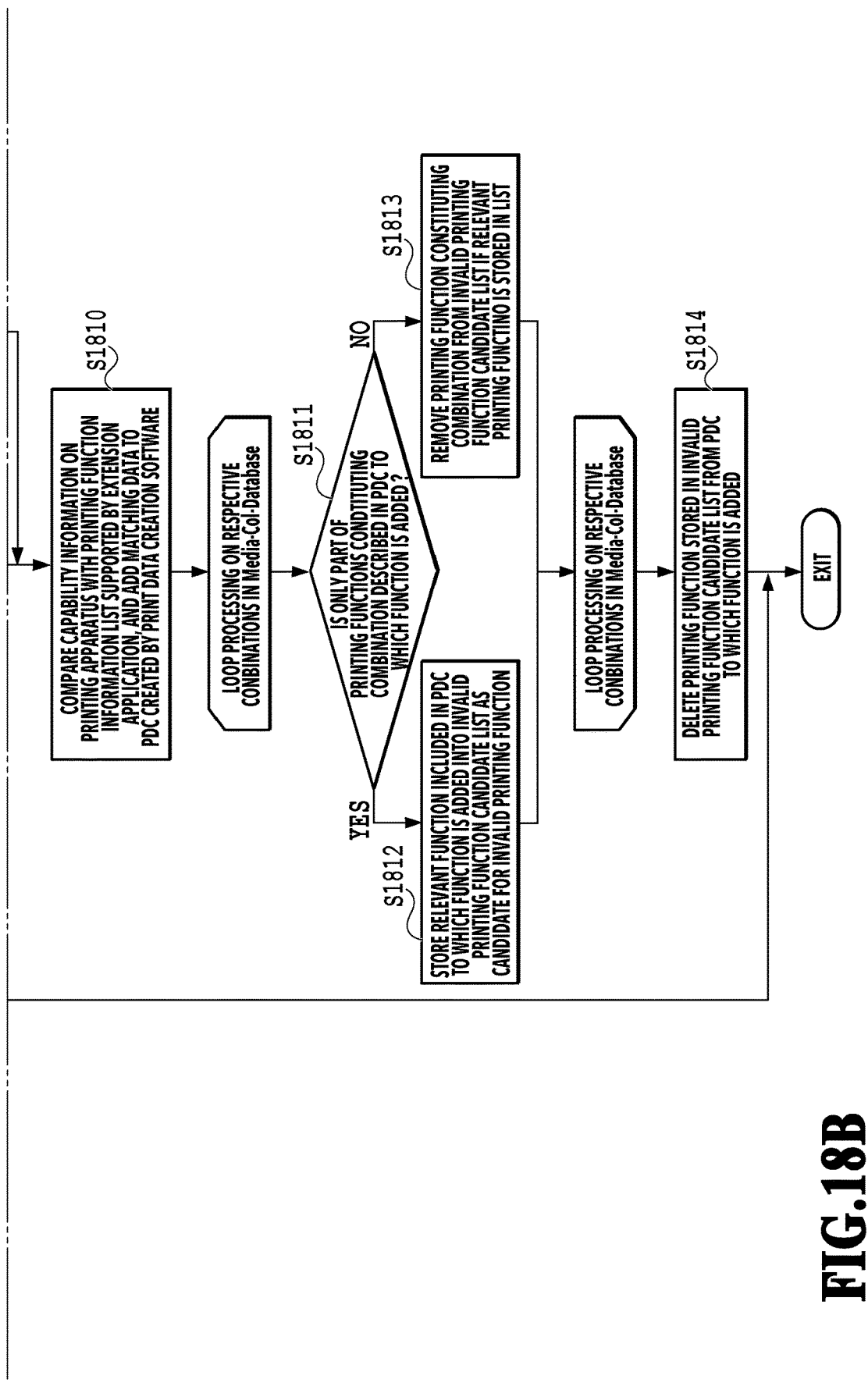

FIGS. 18A and 18B are charts showing a principal processing flow out of the editing processing of the PDC by the printing function extension unit 207 of the Embodiment 3. Here, the processing from S1801 to S1804 is the same as the processing from S1101 to S1104 in FIG. 11A. Moreover, the processing from S1810 to S1814 is the same as the processing from S1105 to S1109. For this reason, explanations on the processing other than S1805 to S1809 will be omitted.

In S1805, the printing function extension unit 207 obtains, from the OS 301, information for specifying which print queue the PDC being an editing target is linked with. Specifically, the printing function extension unit 207 obtains the print queue specification information from the OS 301. In the meantime, the printing function extension unit 207 can create the cache information as described above by obtaining the print queue specification information at this point. The printing function extension unit 207 can determine the necessity of the PDC editing by using this cache information.

Subsequently, in S1806, the printing function extension unit 207 determines whether or not the cache information linked with the print queue obtained from the OS 301 in S1805 is stored in the shared information 210 of the extension application 204. The processing goes to S1807 in the case where a result of determination turns out to be "Yes", or goes to S1808 in the case where the result of determination turns out to be "No".

In S1807, the printing function extension unit 207 determines whether or not there is a difference between the created cache information and the cache information linked with the print queue. Here, the printing function extension unit determines as "Yes" in the case where there is at least one difference among the pieces of the relevant information, and then the processing goes to step S1809. On the other hand, the printing function extension unit determines as "No" in the case where there is no difference, and then terminates this flow.

In S1808, the printing function extension unit 207 newly saves the cache.

Specifically, the printing function extension unit 207 stores the print queue specification information obtained from the OS 301 in S1805 and the "information used for cache" obtained in the processing from S1801 to S1804 in the shared information 210 collectively as the cache information. Thereafter, the printing function extension unit 207 continues the PDC editing processing from the S1810 onward.

In S1809, the printing function extension unit 207 updates the cache information in terms of the piece of the "information used for cache" that is determined to be different. Thereafter, the printing function extension unit 207 continues the PDC editing processing.

The method of the PDC editing processing of the present embodiment has been described above. Now, a description will be given of an example in which the PDC editing processing is further accelerated by using the reason for request of PDC editing obtained from the OS 301 as described in the Embodiment 2 in addition to the present embodiment. As described in the Embodiment 2, in the case where the extension application 204 accepts the PDC editing request from the OS 301, the printing function extension unit 207 can determine the necessity of the PDC editing by obtaining the reason for request of PDC editing from the OS 301.

Here, let us assume a case where the reason for request of PDC editing obtained from the OS 301 is updating of a certain piece of the "information used for cache" described in the Embodiment 3. In this case, regarding pieces of information not subject to updating, the printing function extension unit 207 can skip processing for obtaining the relevant pieces of information by using the cache information stored in the shared information 210 instead. A specific example will be described below.

Let us consider a case where the extension application 204 accepts the PDC editing request from the OS 301 and the reason was the "case where the PDC 601 of the print data creation software 202 is updated". Here, the printing function extension unit 207 obtains the print queue specification information linked with the PDC of the editing target from the OS 301 as with the processing in S1805. Thereafter, the printing function extension unit 207 determines whether or not the cache information that adopts the print queue specification information obtained from the OS 301 as a key is stored in the shared information 210. In the case where the relevant cache information is present, the printing function extension unit 207 only obtains the PDC 601 of the print data creation software 202. The printing function extension unit 207 can refer to the cache information regarding the rest of information. In other words, the printing function extension unit 207 can skip the processing in S1802, S1803, and S1804.

As described above, according to the present embodiment, the printing function extension unit 207 can create the cache of the variety of information used for the PDC editing by obtaining the print queue specification information linked with the PDC of the editing target from the OS 301. The printing function extension unit 207 can determine the necessity of the PDC editing by obtaining the difference between the created cache information and the variety of information newly obtained for use in the PDC editing, and can reduce the processing load by skipping the unrequired PDC editing. Moreover, the printing function extension unit 207 can further reduce the processing load by using the reason for request of PDC editing to be obtained from the OS 301 as described in the Embodiment 2.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-148493, filed Sep. 13, 2021, which is hereby incorporated by reference herein in its entirety.

What is claimed is:

1. A non-transitory computer readable storage medium for storing an extension application program for extending a function of print data creation software to create print data, the extension application program causing a computer in an information processing apparatus to execute:
obtaining information of a plurality of functions from a printing apparatus;
displaying a print setting screen based on at least a part of the obtained information; and
performing control such that among the plurality of functions, a second function that can be used for printing only in combination with a first function which the extension application program does not support is not displayed on the print setting screen.

2. The non-transitory computer readable storage medium according to claim 1, wherein the control is performed such that the second function is not displayed on the print setting screen by editing predetermined information generated by the obtained information.

3. The non-transitory computer readable storage medium according to claim 1, wherein the predetermined information is edited by the extension application program.

4. The non-transitory computer readable storage medium according to claim 1, wherein the print data creation software is software that performs communication by using Internet Print Protocol.

5. The non-transitory computer readable storage medium according to claim 4, wherein the print data creation software is an Internet Print Protocol Class Driver.

6. The non-transitory computer readable storage medium according to claim 1, wherein
the print data creation software is software provided by a vendor of an operating system of the information processing apparatus, and
the extension application program is a program offered from a vendor that provides the printing apparatus.

7. A non-transitory computer readable storage medium for storing an extension application program for extending a function of print data creation software to create print data, the extension application program causing a computer in an information processing apparatus to execute:
obtaining information of a plurality of setting values from a printing apparatus;
displaying a print setting screen based on at least a part of the obtained information; and
performing control such that among the plurality of setting values, a second setting value that can be used for printing only in combination with a first setting value, which the extension application program does not support, is not displayed on the print setting screen.

8. The non-transitory computer readable storage medium according to claim 7, wherein the control is performed such that the second setting value is not displayed on the print setting screen by editing predetermined information generated by the obtained information.

9. The non-transitory computer readable storage medium according to claim 8, wherein the predetermined information is edited by the extension application program.

10. The non-transitory computer readable storage medium according to claim 7, wherein the print data creation software is software that performs communication by using Internet Print Protocol.

11. The non-transitory computer readable storage medium according to claim 10, wherein the print data creation software is an Internet Print Protocol Class Driver.

12. The non-transitory computer readable storage medium according to claim 7, wherein the print data creation software is software provided by a vendor of an operating system of the information processing apparatus, and
the extension application program is a program offered from a vendor that provides the printing apparatus.

13. The non-transitory computer readable storage medium according to claim 7, wherein the first setting value is a setting value for setting a square as a sheet size, and
wherein the second setting value is a setting value for setting a disc as a sheet feeding source.

14. The non-transitory computer readable storage medium claim 7, wherein the first setting value is a setting value for setting a platinum grade as a type of a sheet, and
wherein the second setting value is a setting value for setting highest as a printing quality factor.

15. An information processing apparatus provided with an extension application program for extending a function of print data creation software to create print data, comprising at least one memory and at least one processor and/or at least one circuit which function as:
an obtaining unit configured to obtain information of a plurality of functions from a printing apparatus;
a display unit configured to display a print setting screen based on at least a part of the obtained information; and
a control unit configured to perform control such that among the plurality of functions, a second function that can be used for printing only in combination with a first function, which the extension application program does not support, is not displayed on the print setting screen.

16. A controlling method of an information processing apparatus provided with an extension application program for extending a function of print data creation software to create print data, the controlling method comprising:
obtaining information of a plurality of functions from a printing apparatus;
displaying a print setting screen based on at least a part of the obtained information; and
performing control such that among the plurality of functions, a second function that can be used for printing only in combination with a first function, which the extension application program does not support, is not displayed on the print setting screen.

\* \* \* \* \*